United States Patent [19]
Winterhalter

[11] 3,935,390

[45] Jan. 27, 1976

[54] TELEPHONE ANSWERING AND MESSAGE RECORDING APPARATUS

[75] Inventor: David R. Winterhalter, Berkeley, Calif.

[73] Assignee: Sontel Inc., Alamo, Calif.

[22] Filed: June 4, 1973

[21] Appl. No.: 366,791

[52] U.S. Cl. .................... 179/6 R; 179/100.1 VC
[51] Int. Cl.² ................................. H04M 1/64
[58] Field of Search ........... 179/6 R, 6 E, 100.1 VC

[56] References Cited
UNITED STATES PATENTS

| | | | |
|---|---|---|---|
| 2,816,167 | 12/1957 | Muller et al. | 179/6 R |
| 3,226,478 | 12/1965 | Martin et al. | 179/6 R |
| 3,376,390 | 4/1968 | Hashimoto | 179/100.1 VC |
| 3,715,506 | 2/1973 | Haag et al. | 179/6 E |

Primary Examiner—Bernard Konick
Assistant Examiner—Stewart Levy
Attorney, Agent, or Firm—Phillips, Moore, Weissenberger Lempio & Strabala

[57] ABSTRACT

Telephone answering and message recording apparatus is disclosed which includes an outgoing message delivery system for delivering several messages to each caller, the messages to each caller being separated in time by intervening incoming message recording intervals, and the length of the intervening message recording intervals being determined by voice-operated circuits which determine, for each such interval, whether (a) the caller has started speaking, and whether (b) after commencing to speak, the caller has paused for more than a predetermined interval. After (a) and (b) have occurred, a circuit responsive to the voice-operated circuits initiates circuit action to commence the transmission of the next outgoing message to the caller. The disclosed apparatus includes circuitry for restoring the apparatus to its "awaiting call" condition if the caller remains silent for a predetermined interval after any outgoing message. Preferably, no non-speech signals (e.g., "beep tones") are transmitted to the caller (except during remote playback, or where required, e.g., by FCC or state telecommunications laws or regulations). At least some of the outgoing messages are questions addressed to the caller to elicit, one at a time, specific items of information, such as the caller's telephone number, the caller's name, his business, and the like. The disclosed apparatus also includes a circuit which responds to the lifting of the handset of any telephone connected to the same telephone line as the disclosed apparatus by suppressing further outgoing messages and subsequently resetting the apparatus to receive the next incoming call. The disclosed apparatus may also include a monitoring speaker and associated circuit whereby both the incoming and outgoing messages may be contemporaneously monitored by the user of the apparatus, and an automatically reset squelch circuit including a pushbutton which may be depressed to squelch the monitoring of any incoming call, the squelch circuit automatically resetting itself so that the next incoming call can be monitored without releasing or otherwise manipulating the pushbutton. A novel ring discriminator circuit is also disclosed.

6 Claims, 11 Drawing Figures

FIG. I

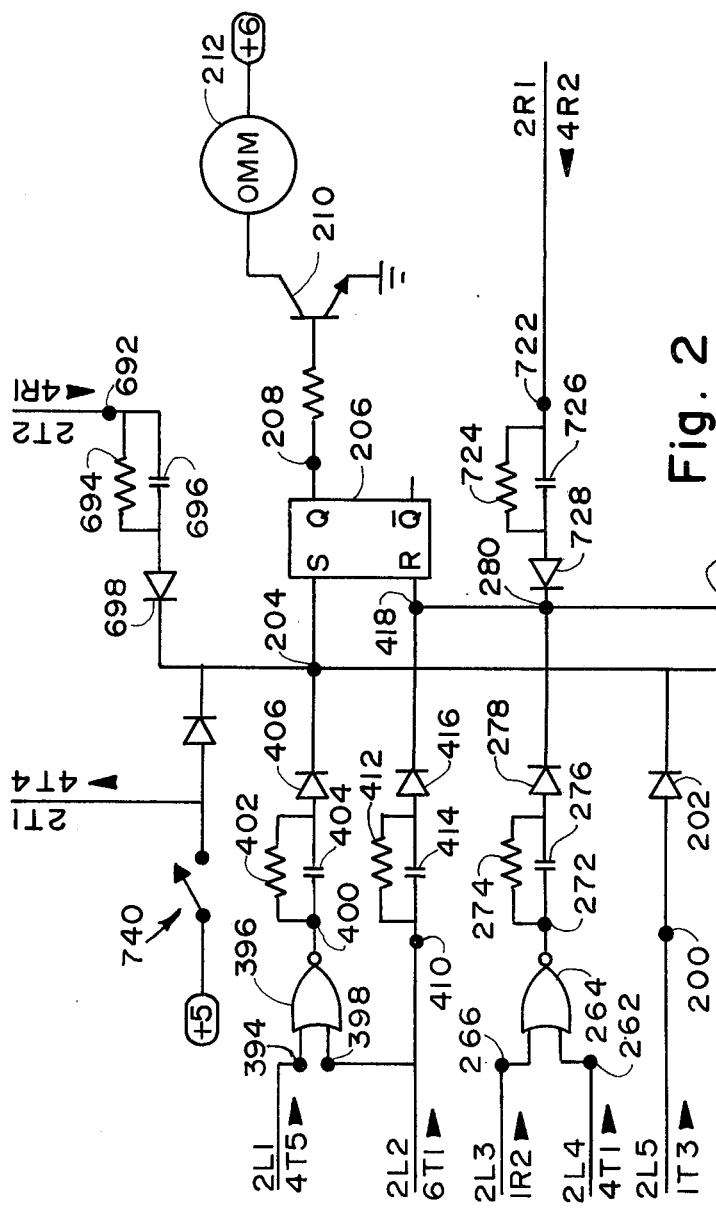
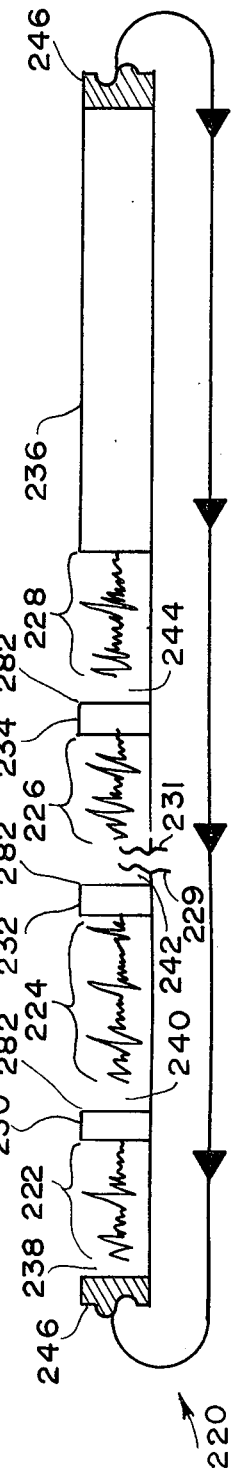
Fig. 2
Fig. 3

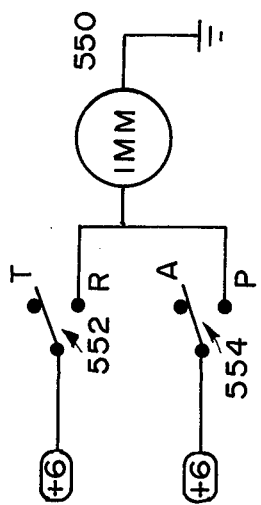
Fig. 8
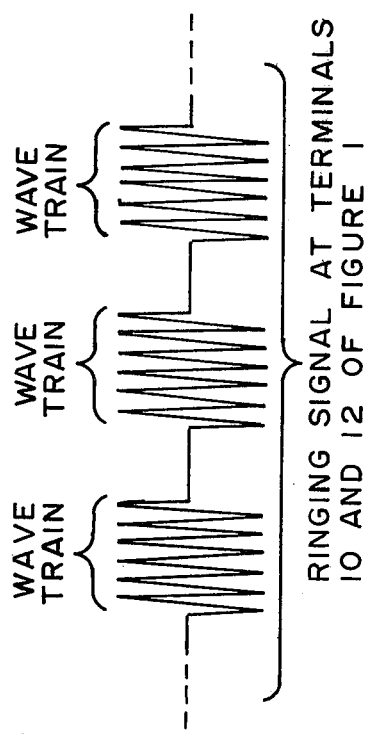
Fig. 11
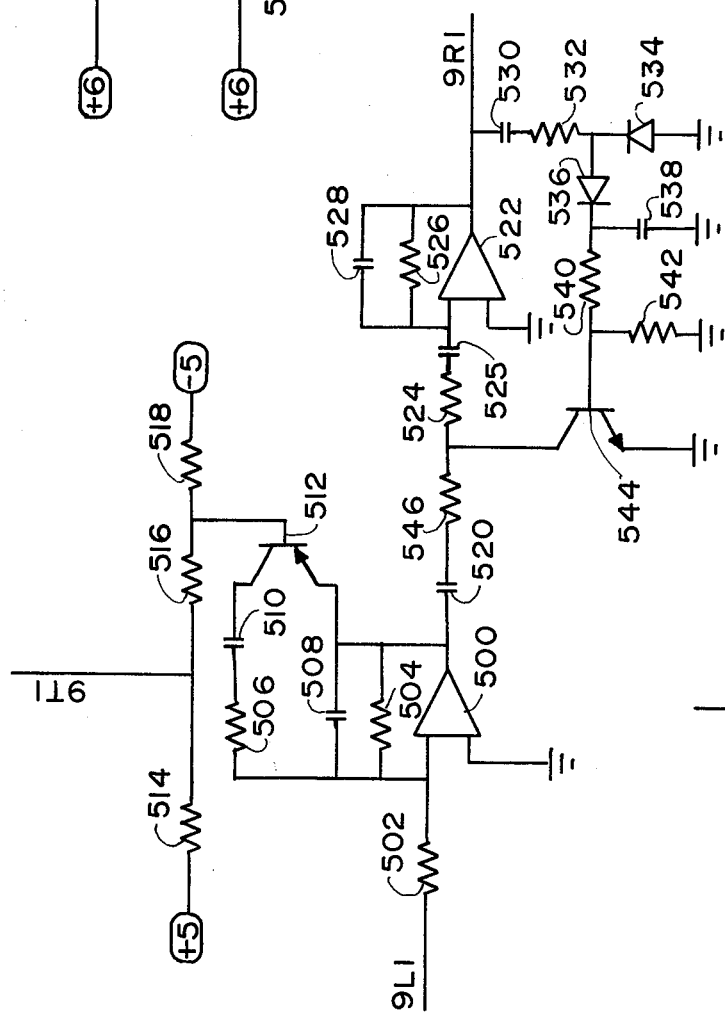
Fig. 9
Fig. 9A

TELEPHONE ANSWERING AND MESSAGE RECORDING APPARATUS

BACKGROUND OF THE INVENTION

1. Field of the Invention

The present invention relates to automatic telephone answering and message recording apparatus, and more particularly, but not by way of limitation, to improvements in such apparatus whereby the effect upon the caller is that of a conversation with a pleasant, courteous human being (rather than that of interrogation by a machine, which signals the caller to commence speaking by issuing an abrupt, non-human "beep tone"), thus putting the caller at his ease, and eliciting more information than prior art devices, to which callers often refuse to respond.

2. Description of the Prior Art

The prior art includes numerous automatic telephone answering and message recording devices. (See, for instance, U.S. Pat. Nos. 2,525,763; 2,816,167; 3,376,390; 3,569,630; and 3,649,762). Some prior art patents relating to automatic telephone answering and message recording devices (e.g., U.S. Pat. No. 3,715,506, and U.S. Pat. No. 3,728,487) refer to the "customer" being able to "carry on a complete conversation with a machine," or to a "conversation . . . of several pre-recorded questions and several answers," but do not disclose any means for simulating conversation with a human called party or telephone receptionist. For instance, both of the immediately above-cited patents employ a "beep tone" or "buzzer" signal to signal the caller to speak after the initial outgoing message has been delivered. Further, both of these patents disclose telephone answering and message recording means in which the time for the caller to record an incoming message is terminated after a predetermined, fixed interval of time; and in which only two outgoing messages, one before the incoming message recording interval and one after the incoming message recording interval are transmitted to the caller. In other words, the telephone answering and message recording means disclosed in both of the immediately previously cited patents provide one and only one incoming message recording interval.

SUMMARY OF THE INVENTION

I have discovered, however, that many callers will not leave a message with a telephone answering device which manifests machine-like characteristics, such as the "beep tone" or "buzz" just mentioned, or transmits to the caller only an initial announcement, thus requiring the caller to frame his response without assistance, and leaving the caller to wonder how soon his recording time will expire, and whether the machine is "listening" at all.

I have also discovered that a telephone answering and message recording device which delivers no non-speech signals to the caller, and presents the caller with a series of questions directed to specific items of information, one at a time, is far more effective in extracting full information from each caller than machines of the just described type.

I have also determined that this effectiveness is considerably increased when the delivery of these intermediate questions is conditioned upon the caller's response to the previous question, rather than being determined by a fixed time base, and thus leaving considerable intervals during which the caller must, but often will not, wait for the next intermediate question, or interrupting the caller before he has completed his response.

Therefore, it is an object of my invention to provide telephone answering and message recording apparatus which is capable of delivering a plurality of separate outgoing messages, exclusive of initial and terminal outgoing messages, to the caller, but does not deliver to the caller any non-speech signals indicating that the caller should immediately commence speaking (i.e., delivers to the caller only such non-speech signals as are required by federal and state telecommunications laws and regulations).

It is yet a further object of my invention to provide telephone answering and message recording apparatus in which at least some of the outgoing messages may be questions directed to the caller to elicit, one by one, specific items of information, thus relieving the caller of the task of mentally composing a multi-aspect message.

It is another object of my invention to provide telephone answering and message recording apparatus equipped with means for preventing the delivery of an outgoing message to the caller so long as the caller is speaking.

It is yet another object of my invention to provide automatic telephone answering and message recording apparatus in which the delivery of a subsequent outgoing message is prevented, and the apparatus is restored to its "awaiting call" condition, if a caller remains silent for a predetermined period of time after the delivery to the caller of an outgoing message.

It is still a further object of my invention to provide automatic telephone answering and message recording apparatus in which an outgoing message after the first is delivered to the caller if and only if the caller has spoken after the end of the previous outgoing message and has subsequently ceased speaking for a predetermined interval of time.

It is yet a further object of my invention to provide automatic telephone answering and message recording apparatus in which the times of delivering each of a series of messages to the caller, following an initial message to the caller, are not predetermined, but are determined in accordance with at least one characteristic of the previous incoming message from the caller.

It is an additional object of my invention to provide automatic telephone answering and message recording apparatus in which monitoring means is provided for contemporaneously audibly reproducing both the incoming and outgoing portions of incoming calls.

It is another object of my invention to provide telephone answering and message recording apparatus of the type described in the previous paragraph, which is also equipped with momentary pushbutton squelch means for silencing said monitoring means for the remainder of any call after the actuation of the pushbutton, and only for the remainder of the call.

It is yet another object of my invention to provide automatic telephone answering and message recording apparatus which responds to the lifting of the handset of any telephone connected to the same telephone line as the apparatus, by suppressing all further outgoing messages, and preparing the apparatus to receive the next incoming call at the termination of the user's conversation with the caller.

Other objects of my invention will in part by obvious, and will in part appear hereinafter.

My invention, accordingly, comprises the features of construction, combinations of elements, and arrangements of parts which are exemplified in the constructions hereinafter set forth, and the scope of my invention will be indicated in the appended claims.

For a full understanding of the nature and objects of my invention, reference should be had to the following detailed description, taken in conjunction wih the accompanying drawings.

BRIEF DESCRIPTION OF THE DRAWINGS

FIG. 2 is a schematic diagram of the outgoing message transport control circuit of the preferred embodiment of my invention;

FIG. 3 is a schematic diagram of the signals recorded upon the outgoing message tape loop of the apparatus of the preferred embodiment of my invention;

FIG. 8 is a schematic diagram of the incoming message transport motor control circuit of the preferred embodiment of my invention;

FIG. 9 is a schematic diagram of the voice amplifier of the preferred embodiment of my invention;

FIG. 9A shows a schematic symbol used to represent the voice amplifier circuit of FIG. 9;

FIG. 11 schematically represents a typical ringing signal impressed on the ringing signal terminals of the preferred embodiment of my invention.

DETAILED DESCRIPTION OF THE INVENTION

Figure 1:
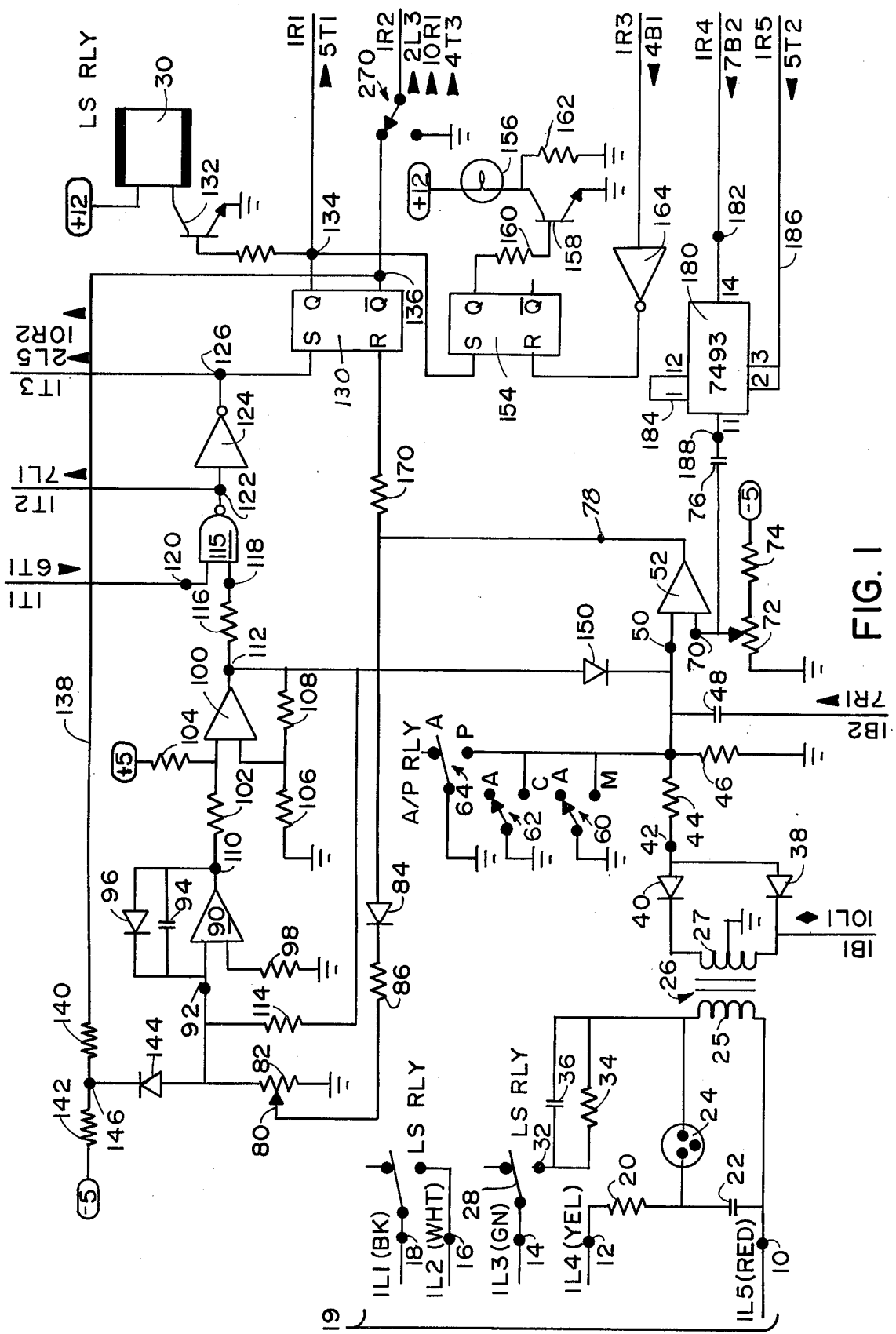
FIG. 1 is a schematic diagram of the line supervisor circuit of the preferred embodiment of my invention.

Before describing the circuit of the preferred embodiment of my invention in detail, it should be noted that the mechanical parts thereof, such as the mechanical parts of the incoming and outgoing message storage and delivery means, including tape transports, tape heads, and the like, and the frame, cabinet, etc., are not described in detail, because such well-known elements will be provided by those having ordinary skill in the art without the exercise of invention.

CONVENTIONS, SYMBOLOGY, AND TERMINOLOGY

For convenience and clarity of understanding, the following conventions, symbols, and terminology are adopted herein.

In order to facilitate the study of the circuit of the preferred embodiment, which cannot be shown in a single figure, and so is shown in a plurality of figures (1, 2, 4, 5, 6, 7, 8, 9, and 10), each interconnection (i.e., interconnection having negligible impedance) between two points located in different figures is specified herein by the following conventions.

1. From each of such points there extends a lead which terminates near an edge of the figure in which the point lies. (See, for example, circuit point 126 and the lead having the legend 1T3 above it in FIG. 1).

2. Each subcircuit figure is assumed to have four edges (top, bottom, left, and right) as viewed from the normal position of reading the legend "FIG.".

3. These edges are respectively designated T (Top), B (Bottom), L (Left), and R (Right).

4. Any lead terminating at an edge of a subcircuit figure is considered to be, and is sometimes called, a terminal of that figure.

5. Each terminal of a subcircuit figure is uniquely identified by a code designation, or home number, located immediately above it. (E.g., 1T3 in FIG. 1.)

6. The middle or alphabetic term of each home number is the letter designating the edge of the figure at which the terminal having that home number is identified. (E.G., the alphabetic term of every home number at the top of a subcircuit figure is T; at the left side of every subcircuit figure is L, etc.)

7. The first numerical term of every home number is the number of the figure in which that home number is located above a lead. (See terminal 1R4, FIG. 1; and 6T1, FIG. 6.)

8. The last numerical term of every home number represents the order in which the corresponding terminal is located on its edge of its subcircuit figure (from left to right on the top and bottom edges; and from top to bottom on the left and right edges.)

9. The home numbers of one or more other terminals will be found below many of the terminals of the subcircuit figures. These are remote terminal home numbers, and indicate the terminals of other sheets to which the particular terminal (indicated by the home number above the same terminal) is directly, short-circuitedly connected. Thus, going to FIG. 6, it can be seen that terminal 6T1 thereof is directly, short-circuitedly connected to terminals 1T1, 2L2, and 4T2 of FIGS. 1, 2, and 4.

10. The arrowheads located near these remote terminal numbers indicate the direction of logical signal flow, and not the direction of current flow.

All movable relay contacts are shown in their "relay de-energized" positions; and where a relay is designated by a pair of letters which also designate the relay positions, the first letter in the relay designation corresponds to the "relay de-energized" position, e.g., the T/R relay is closed through its fixed T contact when de-energized.

In the conventional manner a connection between two leads crossing each other is indicated by a superimposed dot (280, FIG. 2); whereas two leads which cross each other without a superimposed dot are not interconnected. Also, all leads meeting in a T-intersection are interconnected, whether dotted or not.

Appropriate direct current power supplies (not shown) are indicated only by lozenges representing their ungrounded output terminals, these lozenges containing the polarity and approximate voltage of the associated power supply. Circuits indicated only by graphic symbols (e.g., 90, 115, 130, 180) are assumed to be connected to appropriate power supplies and ground terminals, as a matter of ordinary skill in the art.

The expression "L1" denotes a "logical one" signal, which in the preferred embodiment is a positive direct current voltage lying between approximately 2.4 and 5.0 volts.

The expression "L0" denotes a "logical zero" signal, which in the preferred embodiment is a positive voltage lying between approximately 0.0 and 0.8 volts.

The following expressions are sometimes represented by the designations set thereafter in parentheses. Incoming Message (IM). Outgoing Message (OM). Outgoing Message Tape Erase Head (OME). Outgoing Message Tape Recording and Playback Head (OMH). Incoming Message Tape Erase Head (IME). Incoming Message Tape Recording and Playback Head (IMH). Outgoing Message Tape Drive Motor (OMM). Incoming Message Tape Drive Motor (IMM).

The word "user" as employed herein denotes any person who listens to incoming messages which have been recorded, or who monitors via the built-in speaker incoming messages which are being recorded, by the device of the preferred embodiment, or who physically manipulates the device of the preferred embodiment (e.g., to prepare an outgoing message tape).

CONSTRUCTION

Referring now to FIG. 1 there is shown the line supervisor circuit of the preferred embodiment of the present invention. At the left edge of FIG. 1 there are shown the telephone line terminals 10, 12, 14, 16, and 18 of the device of the preferred embodiment, connected to lines 1L5 (RED), 1L4 (YELLOW), 1L3 (GREEN), 1L2 (WHITE), and 1L1 (BLACK), respectively, of telephone subscriber line circuit 19. The voice signal input to the device of the preferred embodiment is received on lines 1L5 and 1L3, connected across telephone line terminals 10 and 14. The ringing signal is received by the device of the preferred embodiment on lines 1L5 and 1L4, connected across telephone line terminals 10 and 12. Lines 1L1 and 1L2, connected to terminals 16 and 18, respectively, are auxiliary lines of the kind commonly found in telephone practice, which, for instance, are used to operate indicator lights in multiple line telephone installations. It will be understood by those having ordinary skill in the telephone art that other line arrangements and colors than those indicated in FIG. 1 are commonly found in telephone practice. For example, in installations wherein the voice signals and ringing signals are carried by the same conductor, terminals 12 and 14 will be directly connected together. The device of the present embodiment is readily adaptable to most domestic telephone circuits.

Connected across terminals 10 and 12 is a ring discriminating network comprising resistor 20, capacitor 22, and gaseous discharge device 24. Resistor 20 may typically have a value of 100,000 Ohms, and capacitor 22 a value of 0.05 Microfarads. Gaseous discharge device 24 may, for instance, be an NE-2 neon lamp. This network serves to discriminate ringing signals from other signals which may occur on the telephone line, such as talking signals, switching transient signals, and dialing pulses which are generated when any telephone connected to subscriber line 19 is dialed.

As is well-known to those having ordinary skill in the telephone art, and schematically illustrated in FIG. 11, the ringing signal received at terminals 10 and 12 will, typically, consist of a series of separate wave trains. When a ringing signal wave train (FIG. 11) is received across terminals 10 and 12, capacitor 22 is repeatedly charged through resistor 20 to a voltage level which causes lamp 24 to fire, thus producing a current pulse in the primary winding 25 of line transformer 26. One or more of such current pulses in primary winding 25 of line transformer 26 is produced by each wave of said series of wave trains. Each time lamp 24 fires, capacitor 22 is partially discharged, the voltage across lamp 24 falls below extinction potential, and lamp 24 is extinguished, whereby this network is conditioned for producing the next current pulse in primary winding 25 of line transformer 26.

Going to terminal 14, it will be seen that an armature contact 28 of the line seizure relay 30 of the device of the preferred embodiment is connected thereto. The coil of line seizure relay 30, also designated as LS RLY herein, is shown in the upper right hand corner of FIG. 1. Armature 28 of line seizure relay 30 coacts with fixed contact 32 to close the talking circuit of subscriber line circuit 19 through the internal direct current path described hereinbelow when the coil of relay 30 is energized.

In accordance with the convention used throughout the present disclosure, armature 28 is shown in its "relay deenergized" position.

When LS RLY contacts 28 and 32 are closed, resistor 34 and the primary winding of line transformer 26 together form an internal direct current path between terminals 10 and 14 of impedance comparable to that of an ordinary telephone instrument. Capacitor 36 provides a shunt for voice signals, across resistor 34.

RING-IN CIRCUIT

As will be evident to those having ordinary skill in the art, the secondary winding 27 of line transformer 26 is interconnected with diodes 38 and 40 into a full wave rectifier network, the center tap of the secondary winding being grounded, as shown.

The lower end of the secondary winding 27 of transformer 26 is connected to other parts of the circuit of the present embodiment by way of the lead above which is found the legend 1B1. The legend 10L1 below this lead indicates that lead 1B1 is directly, short-circuitedly connected to the uppermost (No. 1) terminal found at the left hand edge of FIG. 10.

The signal occurring at point 42 consists of negative-going excursions corresponding to the positive and negative excursions of the signal appearing across the secondary winding of transformer 26.

Resistors 44 and 46 and capacitor 48 function as a filter network to eliminate high-frequency components from the rectifier output signal at point 42. Resistors 44 and 46 may, for instance, have values of 150,000 Ohms and 330,000 Ohms, respectively, and capacitor 48 may have the value of 0.01 Microfarads. The output signal from this filter network is applied to input terminal 50 of operational amplifier 52. Also, as hereinafter explained, additional signals are sometimes supplied to terminal 50 via lead 1B2, capacitor 48 serving as an a.c. coupling capacitor for these additional signals.

Switch contact sets 60, 62, and 64 may be used to prevent input signals from reaching amplifier terminal 50, for reasons which will be made evident hereinafter. Each of these contact sets is part of a different switch or relay assembly, all of which different assemblies will be described in detail hereinafter.

The non-inverting input terminal 70 of the Ring/Disconnect Amplifier 52 is biased by the network comprising potentiometer 72 and resistor 74, which are connected between the negative five volt supply and ground. As described hereinafter, a signal may sometimes be supplied to terminal 70 via capacitor 76, which may, for instance, have a value of 0.1 Microfarads.

When the device of this embodiment is receiving ringing signals, which appear as negative-going signals at input terminal 50, as described above, amplifier 52, which is connected as a comparator, produces positive-going signals whenever the signals at terminal 50 become more negative than the bias voltage impressed on terminal 70.

In general, then, it will be seen that a positive-going signal of substantially fixed amplitude (corresponding to the positive saturation output voltage of amplifier 52) will be produced at terminal 78 each time a negative-going signal exceeding the voltage at terminal 70 is impressed on input terminal 50. Otherwise, the output voltage at terminal 78 is substantially equal to the negative saturation output voltage of amplifier 52.

Going to the upper portion of FIG. 1, the ring-in circuit of the present invention will now be described. Considering slider 80 of potentiometer 82 to be the input terminal of the ring-in circuit, it will be seen in FIG. 1 that the input signal to the ring-in circuit is supplied from output terminal 78 of the aforementioned amplifier 52 via diode 84 and resistor 86.

Diode 84 serves to prevent negative-going signals from reaching the ring-in circuit. Resistor 86, which may, for instance, have a value of 1,000 Ohms, serves to limit the current to the slider 80.

Operational amplifier 90 is connected as an inverting integrator, to invert and integrate the signal received at its input terminal 92 directly from the upper terminal of potentiometer 82. Capacitor 94 serves to determine the integration constant of the integrator circuit including amplifier 90, in the well-known manner. Capacitor 94 may, for instance, have a value of 10 Microfarads. Diode 96 serves as a clamp to prevent the output of the integrator from becoming positive. Resistor 98 serves to compensate for the effects of the input offset current characteristic of amplifier 90, in the well-known manner.

Operational amplifier 100 is connected in circuit with resistors 102, 104, 106, and 108 as a voltage comparator (with hysteresis), of the type well-known to those having ordinary skill in the art. It is a property of this hysteritic comparator network (having circuit point 110 as its input terminal, and circuit point 112 as its output terminal) that whenever the signal at point 110 becomes more negative than a first threshold level, the potential at point 112 changes from the negative saturation output level to the positive saturation output level of amplifier 100. It is an additional property of this hysteritic comparator network that once the output at point 112 has changed to positive saturation value, as described immediately above, then it will remain at that level until the voltage at input terminal 110 becomes less negative than a second threshold level which is less negative than said first threshold level. This property of this comparator network is a type of circuit characteristic which is known to ordinary workers in the art as "hysteresis."

The positive feedback connection including resistor 114 serves to force the output of the integrator network including amplifier 90 to slowly drift toward one of its output voltage limits: toward its negative output voltage limit when point 112 is positive, and toward its positive output voltage limit when point 112 is negative. Resistor 114 may, for example, have a value of 10 Megohms.

The just described circuit including amplifiers 90 and 100 serves to provide a positive-going output signal at point 112 which occurs only after a predetermined number of ringing signal wave trains have been received at telephone line terminals 10 and 12. The number of ringing signal wave trains which must be received in order to produce said positive-going signal at point 112 may be adjusted by adjustment of slider 80 of potentiometer 82.

The output signal at point 112 is applied to the lower input terminal of NAND gate 115 via resistor 116. Resistor 116 limits the current out of NAND gate input terminal 118 when point 112 is negative, as described above. As may be seen in FIG. 1, input terminal 120 of NAND gate 115 is connected to terminal 6T1 of FIG. 6 of the present drawings. As described hereinbelow the signal on interconnection line 1T1-6T1, i.e., the signal at terminal 120 of NAND gate 115, is at L1 level when the outgoing message tape of the device of the present embodiment is at its home position, i.e., is prepared for an incoming call. During the cycling of the outgoing message tape the signal at input terminal 120 is at the L0 level of the device of the present invention. Thus, it may be seen that the ringing status information derivable from the signal at point 112 cannot be passed to point 122 unless the outgoing message tape loop of the device of the present embodiment is standing at its home position.

Assuming, then, for purposes of the present discussion, that the signal at input terminal 120 is L1, the signal at point 122 is an L1 signal when point 112 is negative, and is an L0 signal when point 112 is positive.

Figures 5, 6, 7:
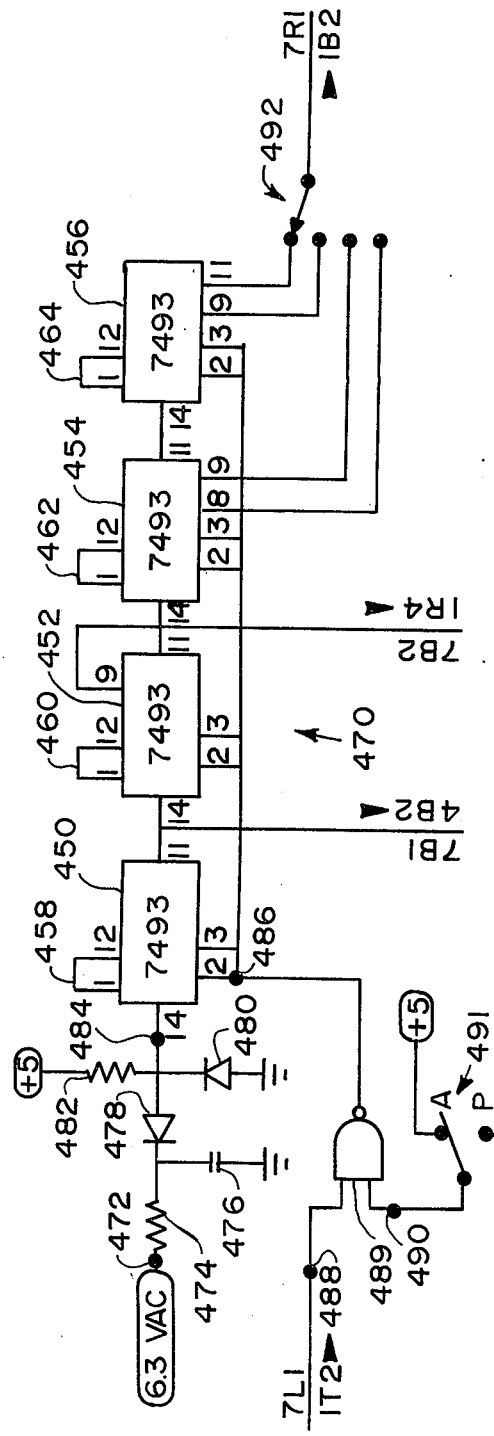
FIG. 5 is a schematic diagram of the syllable detector circuit of the preferred embodiment of my invention.
FIG. 6 is a schematic diagram of the outgoing message tape home position detector circuit of the preferred embodiment of my invention.
FIg. 7 is a schematic diagram of the master clock circuit of the preferred embodiment of my invention.

The signal at point 122 serves, inter alia, to reset the master clock circuit shown in FIG. 7. More particularly, the master clock circuit is reset whenever an L0 signal appears at point 122. This condition occurs at the beginning of each answer cycle, after the number of ringing signal wave trains predetermined by the setting of potentiometer 82 have been received, and only then. This resetting action continues until the ring-in circuit returns to its rest state, as hereinafter described.

Inverter 124 inverts the logical signal occurring at point 122.

The signal at point 126, connected via interconnection 1T3-2L5 to the outgoing message transport control of FIG. 2, serves to start the outgoing message tape transport drive motor whenever it goes to its L1 state, i.e., at the beginning of each ordinary answering cycle, i.e., when the number of ringing signal wave trains predetermined by the setting of potentiometer 82 has been received.

The signal at point 126 also serves to switch the line seizure flip-flop 130 (sometimes herein designated LS FF) to its set state, thereby causing the closing of relay contacts 28 and 32, and the seizing of the telephone line, in the following manner.

Referring to the upper right-hand corner of FIG. 1, it will be seen that transistor 132 controls the energizing current through line seizure relay coil 30.

Whenever the Q terminal 134 of flip-flop 130 is in its L1 state, i.e., at about 2.5 volts positive, relay coil 30 is energized. Thus, relay coil 30 is energized whenever flip-flop 130 is in its set state. It will thus be seen that when flip-flop 130 is in its set state, contacts 28 and 32 are closed. When contacts 28 and 32 are closed, a direct current path is provided through resistor 34 and the primary winding of transformer 26, between terminals 10 and 14, thus "seizing the line," i.e., providing a signal at the telephone company's central office denoting that the telephone line to which the device of the invention is connected is in use. At the same time the additional line seizure relay contact pair connected across terminals 16 and 18 is closed.

NO-DISCONNECT INTERVAL

It will now be seen that the receipt of a predetermined number of incoming ringing signal wave trains has caused flip-flop 130 to be set, and thus brought about the seizure of the telephone line. This being so, the ring-in circuit need no longer be maintained in its activated or incoming call indicating state. Therefore, the ring-in circuit can be, and is, utilized to perform a second function, that of determining a brief time interval (e.g., 3 seconds) during which disconnection from the telephone line cannot occur. This no-disconnect interval allows for the completion of switching at the telephone company central office, which switching might generate transient voltages which could otherwise cause disconnection of the device of the present embodiment.

The commencement of this no-disconnect interval is brought about by the setting of flip-flop 130. That is to say, the appearance of the L0 signal at Q terminal 136 of flip-flop 130 causes the output of integrator amplifier 90 (at point 110) to go to 0 volts, as follows.

The connection from the Q terminal of flip-flop 130 by means of which the abovesaid no-disconnect interval is initiated comprises line 138, resistor 140 (e.g., 270,000 Ohms), resistor 142 (e.g., 120,000 Ohms), and diode 144, all connected as shown in FIG. 1.

As may be seen by those having ordinary skill in the art, informed by the present disclosure, whenever the Q terminal of flip-flop 130 is at L1 potential circuit point 146 is positive, due to the voltage divider action of resistor pair 140, 142. When point 146 is positive diode 144 is reverse-biased and does not conduct, and thus the feedback circuit including line 138 does not effect the operation of the above-described ring-in circuit.

When, however, the Q terminal of flip-flop 130 is at L0 potential, circuit point 146 is negative, and conduction through diode 144 takes place. For this reason, current flows out of input terminal 92 of integrator amplifier 90, through diode 144 and resistor 142, thus causing the integrator circuit to integrate toward zero output voltage. When the voltage at output terminal 110 of integrator amplifier 90 passes the above-described second threshold voltage of said hysteritic comparator circuit, then the output of said hysteritic comparator amplifier at point 112 switches from a positive value to a negative value. Thus ending the above-described no-disconnect interval, as will now be shown.

Referring now to diode 150 (near the center of FIG. 1), it will be seen by those having ordinary skill in the art that so long as the circuit point 112 remains positive, diode 150 conducts, and thus terminal 50 of ring-/disconnect comparator amplifier 52 remains positive. Whenever terminal 52 is at positive potential ring/disconnect comparator amplifier 52 is disenabled from producing output signals corresponding to ringing signals received from the telephone line (or disconnect signals, as will be explained hereinafter).

As pointed out hereinabove, circuit point 112 is made positive whenever the ring-in circuit has received a predetermined number of ringing signal wave train signals (from output terminal 78 of comparator 52). Circuit point 112 remains positive until the end of said no-disconnect interval, whereupon point 112 becomes negative, at which time diode 150 ceases to conduct, and comparator 52 is enabled to produce positive pulses corresponding to received ringing or disconnect signals. (It will, of course, be recognized by those having ordinary skill in the art that ringing signals are not received during line seizure, i.e., are not supplied by the telephone company central office while the line is in use.)

Going now to the right-hand edge of FIG. 1, there is shown a flip-flop 154 (sometimes called the CALL FF). This flip-flop functions to operate call light 156 via transistor 158, in order to indicate that at least one telephone call has been answered by the device of the present embodiment.

When the Q terminal of flip-flop 154 is at L1 potential transistor 158 is caused to conduct, thereby lighting lamp 156. Resistor 160 may, for instance, have a value of 1,000 Ohms, serving to limit the base current to transistor 158. Resistor 162, which may have a value of 270 Ohms, is a "keep alive" resistor, whereby current is maintained in the filament of lamp 156 even during its "off" state of operation. This current is, of course, less than is required to cause lamp 156 to produce visible light.

Inverter 164 is provided to reset flip-flop 154 whenever an L0 signal appears on interconnection 1R3–4B1. This resetting action occurs when the user of the device of the preferred embodiment commences to play back the incoming messages which have been recorded by the device.

AUTOMATIC BREAK-IN RESET AND CALLING PARTY DISCONNECT

In accordance with a particular feature of the present invention, provision is made in the device of the preferred embodiment to disconnect the device from the telephone talking circuit (terminals 10 and 14) whenever (a) a calling party disconnect signal is received from the telephone company central office, indicating that the caller has hung up, or (b) the user of the device of the preferred embodiment lifts the handset of any telephone connected to the same telephone line as the device.

(Disconnection from the talking circuit is also accomplished in response to internal disconnect signals generated within the device. These internal disconnect signals will be discussed hereinafter.)

CALLING PARTY DISCONNECT

As is well known to those having ordinary skill in the telephone art, many telephone companies provide calling party disconnect signals to the called party telephone line (the voice circuit). These signals generally take the form of brief voltage pulses of greater magnitude than the voice signals. In the device of the present embodiment these disconnect signals are coupled through line transformer 26 and are rectified by diodes 38 and 40, resulting in a negative-going pulse at point 42. (It will be recognized by those having ordinary skill in the art that both negative-going and positive-going calling party disconnect signals applied to the primary winding 25 of transformer 26 will result in negative-going pulses at point 42.)

In the manner described hereinabove, negative-going pulses at point 42 result in negative-going pulses at input terminal 50 of comparator 52, the high frequency components having been attenuated as by the filter network comprising resistors 44 and 46 and the capacitor 48, as described hereinabove. As is well-known to those having ordinary skill in the art, said calling party disconnect signals are of considerably greater amplitude than the voice signals occurring in the same circuit. Thus, the threshold of comparator amplifier 52 set by the potential of point 70 is able to discriminate between voice signals and calling party disconnect signals. In general, the voice signals at point 50 of the device of the preferred embodiment will be less than about 0.2 volts in maximum amplitude, whereas calling party disconnect signals received at point 50 will be of greater magnitude than 0.2 volts. In the event that actual line conditions obtaining in a given installation do not provide voice and calling party disconnect signals within these ranges, potentiometer 72 may be manipulated to change the potential at point 70, i.e., the threshold voltage of comparator amplifier 52, to compensate.

Thus it may be seen that the device of the preferred embodiment is adapted, or may be adjusted, to provide positive-going pulse signals at point 78 when calling party disconnect signals are received, but not when voice signals are being received or transmitted.

When a calling party disconnect signal produces a positive-going pulse at terminal 78, the pulse is applied to the reset terminal of flip-flop 130, via resistor 170 (which may have a value of 2,700 Ohms), thereby resetting flip-flop 130 and terminating the current through coil 30 of the line seizure relay, thus causing contacts 28 and 32 to open, and releasing the telephone line.

The just described action of the circuit of the preferred embodiment discriminates not only against very low amplitude incoming voice signals, but also discriminates against considerably higher amplitude outgoing voice signals.

AUTOMATIC BREAK-IN RESET

According to a particular feature of the present invention, the device of the preferred embodiment shown and described herein is so constructed and arranged that an automatic answering cycle which is in progress is automatically and immediately terminated, and the device reset to its ready-to-receive-call state, whenever the handset of any telephone connected to the same telephone line is lifted.

By this means the user of the answering device of the invention who is monitoring incoming messages by means of a loudspeaker provided as part of the device, need only lift the handset of the extension telephone nearest to him and commence speaking to the caller; the disconnecting and resetting of the answering device being accomplished automatically.

By contrast with the devices of the prior art, the telephone device of the present invention frees the user from the necessity of manipulating manual controls in order to interrupt the answering cycle and prepare the telephone answering device for the next incoming call.

It will be understood, after fully considering the present disclosure, that the automatic break-in reset feature of the present invention is particularly advantageous in telephone answering devices incorporating the pseudo-conversational operating mode feature of the present invention, which is described in detail hereinafter. In accordance with the pseudo-conversational mode of operation, the telephone answering device of the present invention directs a series of questions to the caller, eliciting such information as the caller's purpose in calling, the caller's name, and to whom the caller wishes to speak; allowing the caller to respond to each question, and only putting the next question after a predetermined pause in the caller's response.

The user of the device of the invention can, if he chooses, monitor this entire "question-and-answer" process by means of an auxiliary loudspeaker, and will thus often find it desirable to break into incoming calls.

Thus, it will be clear that in order to fully take advantage of the conversational effect achieved by the device of the preferred embodiment the automatic break-in reset feature of the invention is highly desirable, so that none of the outgoing questions which might otherwise be transmitted after the break-in will be transmitted.

The automatic break-in reset feature of the present invention is accomplished in the preferred embodiment as follows.

Before discussing the structure by which automatic break-in reset is carried out, however, it is desirable to refer to the electrical state of the telephone line during use, as brought about by the telephone company central office equipment.

When the associated telephone line is seized by the device of the preferred embodiment, as described hereinabove, a direct current flows through a path consisting of line seizure relay contacts 28 and 32 (closed), resistor 34, and the primary winding of line transformer 26. This current flow is the result of a potential applied to the line at the telephone company central office, in accordance with the usual practice in telephone art. For the purposes of the present occasion this potential will be called the "line voltage."

The D.C. voltage at the terminals of the subscriber's line will, of course, depend, among other things, upon the resistance connected thereacross. When the device of the preferred embodiment is connected across the telephone line the line voltage across terminals 10 and 14, typically, will be about 8 volts.

As will be evident to those having ordinary skill in the telephone art, the steady state direct current through primary winding 25 or line transformer 26 will not by itself produce a signal in secondary winding 27. When the magnitude of this current through primary winding 25 is altered, however, a transient pulse is produced in secondary winding 27. Such a change in the magnitude of the current through primary winding 25 is produced when the handset of a telephone instrument connected to the same line as the device of the preferred embodiment is lifted, thus placing the resistance of that instrument in shunt with the input resistance of the device of the preferred embodiment, comprised of the series combination of resistor 34 and the primary winding 25. This shunting of the input resistance of the telephone answering device of the invention necessarily reduces the direct current flowing through primary winding 25, which change in current magnitude produces the said pulse in the secondary winding 27. This pulse, herein called the "break-in pulse" will in general be of lower amplitude than the aforedescribed calling party disconnect pulse (at circuit point 42). However, the break-in pulse will, characteristically, be of somewhat greater amplitude than the pulses at point 50 due to transmitted or received voice signals.

The threshold setting of comparator amplifier 52 also serves in large part to discriminate between the break-in pulse and the voice signal pulses.

Because of these discriminating effects terminal 50 of comparator amplifier 52 will respond to break-in pulses, but not to said voice signal pulses.

As discussed hereinabove, comparator amplifier 52 produces at output terminal 78 a positive-going pulse whenever it receives a negative input signal exceeding its threshold. As further described hereinabove a pulse occurring at point 78 serves to reset flip-flop 130, thereby disconnecting the device of the preferred embodiment from the talking circuit of the associated telephone line. It will be evident to one having ordinary skill in the art, upon review of the present disclosure, that the pulse at point 78 resulting from a break-in pulse, or any other disconnect signal received at terminal 50, will be transmitted to the input of the ring-in circuit. It will be further understood by those having ordinary skill in the art, however, that the integrator circuit including operational amplifier 90 will not produce a significant output at terminal 110 by virtue of having received only one or two pulses from terminal 78, as opposed to a series of 10 or more pulses in an incoming ringing signal. Thus, it will be understood that a break-in pulse or other disconnect signal pulses will not invoke operation of the ring-in circuit.

MAXIMUM TIME DISCONNECT CIRCUIT

Referring now to FIG. 1 there is shown capacitor 48 which serves to couple to input terminal 50 of ring/disconnect amplifier 52 a negative-going pulse from the master clock of the device of the preferred embodiment. (FIG. 7). This pulse causes disconnection of the voice circuit and resetting of the telephone answering device of the preferred embodiment to the ready-to-receive-call state, after the lapse of a predetermined time interval (e.g., 4.5 minutes) which time interval commences with the start of an automatic answering cycle.

As will hereinafter be explained in detail, said time interval can be selected by the user of the device (between, say, for values) by manipulation of the switch connected to terminal 7R1 of FIG. 7. Upon receipt of this pulse at terminal 50 the ring/disconnect comparator amplifier produces a positive-going pulse at its output terminal 78, which pulse serves to disconnect the device of the embodiment from the talking circuit of the telephone line, and also initiates the resetting of the device to its ready-to-receive-call state, in the manner described hereinabove.

NO RESPONSE DISCONNECT CIRCUIT

As is well-known to those having ordinary skill in the art, the central office equipment of some telephone companies does not provide a calling party disconnect signal of the type described above to the called party circuit when the calling party hangs up. For this reason means are provided in the device of the preferred embodiment whereby the device is disconnected from the talking circuit and reset to its ready-to-receive-call state if at any time during the answering cycle no voice signals occur in the talking circuit of the telephone line for a predetermined period (e.g., 8.5 seconds). This period is determined by counter 180 (FIG. 1). This counter may, for instance, be a TTL integrated circuit, Type 7493, four-stage binary counter (divide-by-sixteen counter), made by the Fairchild Semiconductor Corporation. The clock input terminal 182 of this counter receives a square wave signal of about one cycle per second repetition rate by way of interconnection 1R4–7B2 from the master clock of FIG. 7, this square wave being continuously received by counter 180 so long as the power switch of the device of the embodiment is on. Direct connection 184 serves to connect the independent stage of the 7493 counter circuit with the three intercoupled stages, resulting in a four-state counter and a total frequency division of 16. Common terminal connection 186 serves to reset counter 180 to its zero count state whenever an L1 pulse is received from the syllable detector (FIG. 5) via interconnection 1R5–5T2. As will be explained hereinafter, the syllable detector emits an L1 pulse each time a signal having the approximate electrical characteristics of a speech syllable is received from the voice circuit of the telephone line. If none of these L1 pulses is received during the time required for counter 180 to reach its maximum count, then the voltage at terminal 188 switches from L0 to L1. This voltage change is coupled through capacitor 76 as a positive-going pulse to non-inverting input terminal 70 of comparator amplifier 52. Such a positive-going pulse received at terminal 70 has the same effect as a negative-going pulse received at terminal 50, i.e., the emission of a positive-going pulse from output terminal 78. That is to say, when terminal 70 becomes more positive than terminal 50, which, normally is at ground potential, then output terminal 78 becomes positive. This positive pulse at terminal 78 brings about the disconnection of the device of the preferred embodiment from the associated telephone line talking circuit, and initiates the resetting of the device to its ready-to-receive-call state, as explained hereinabove.

OUTGOING MESSAGE CONTROL

Referring now to FIG. 2, the operation of preferred embodiment at the start of an answering cycle will be explained. As explained above an L1 signal is provided on interconnection 1T3–2L5 after a predetermined number of ringing signal wave trains has been detected by the ring-in-circuit (FIG. 1), provided that the outgoing message tape loop is at its home position. The time of occurrence of this L1 signal will hereinafter be taken to be the start of the answering cycle. As described above, the L1 signal is maintained for a brief period, e.g., 3 seconds, after which interconnection 1T3–2L5 returns to its normal L0 level.

When this L1 signal appears at terminal 200 of FIG. 2 (i.e., interconnection 1T3–2L5) diode 202 conducts, thereby raising circuit point 204 (FIG. 2) to its L1 level. This occurrence in turn sets flip-flop 206 (sometimes referred to as OMM FF, or the outgoing message motor flip-flop). At the time of the setting of flip-flop 206 terminal 208 (Q) goes to its L1 level, thereby turning on transistor 210, which in turn energizes the outgoing message motor (OMM), i.e., the motor which drives the outgoing message tape transport mechanism. The starting of outgoing message motor 212 commences the transmission to the caller of the first outgoing message from the device of the preferred embodiment; the first outgoing message being denoted in FIG. 3 by reference character 222.

THE OUTGOING MESSAGE TAPE LOOP

Referring now to FIG. 3 there is shown schematically the information recorded on the outgoing message tape 220 of the device of the preferred embodiment. While an endless tape loop is used for convenience in the preferred embodiment, it is to be understood that the present invention embraces telephone answering devices in which other means of storing the outgoing messages and control information are used.

As may be seen from FIG. 3, the outgoing message tape loop 220 is impressed with a plurality of separate outgoing messages 222, 224, 226, and 228. As indicated by break lines 229, 231, the device of the preferred embodiment is not necessarily limited to the provision of four outgoing messages, rather, any number of outgoing messages may conveniently be recorded on the outgoing message tape by the user of the device in the manner hereinafter described.

In accordance with a principal feature of the present invention, at least some of this series of messages may be queries directed to the caller in a pleasant voice, requesting successive items of information desired of the caller. It is a characteristic feature of the preferred embodiment of the present invention that no beep or other non-speech signals are transmitted to the caller, other than those which may be required by state or federal law.

As further shown in FIG. 3, a tone signal is provided at the end of each outgoing message, these tone signals being designated by the reference numerals 230, 232, 234, and 236. These tone signals are sometimes referred to herein as transmit/receive control tone signals or T/R tone signals. As will be shown in detail hereinafter, means are provided in the preferred embodiment whereby these tone signals are prevented from reaching the caller.

Typically, each of these tone signals may be a continuous tone of about 4,200 cycles per second, having a duration of about two seconds. The detailed utilization of these signals will be described hereinafter.

As will further be seen in FIG. 3, pauses are provided, wherein there are no signals on the tape, between the termination of said T/R signals and the commencement of each immediately following message. These pauses 238, 240, 242, and 244, are provided in order to allow for deceleration and acceleration of outgoing message tape loop 220, in preparation for transmission of each outgoing message. Home position sensing means 246 may be, for instance, a metallic foil cemented to the tape loop 220, which is sensed by the photoelectric home position sensing means of FIG. 6. The circuit of FIG. 6 produces a signal which serves to stop the tape loop 220 at its home position, i.e., when sensing means 246 is approximately adjacent the sensing phototransistor of FIG. 6, as will hereinafter be described in detail.

Other message termination signal means and home position signal means may be provided by those having ordinary skill in the art without the exercise of invention.

As may be seen in FIG. 3, the T/R tone signal 236 following the last recorded outgoing message (228) is recorded on the outgoing message tape loop continuously between the end of the last outgoing message 228 and the sensing means 246.

TRANSMIT /RECEIVE CONTROL

Figure 4:
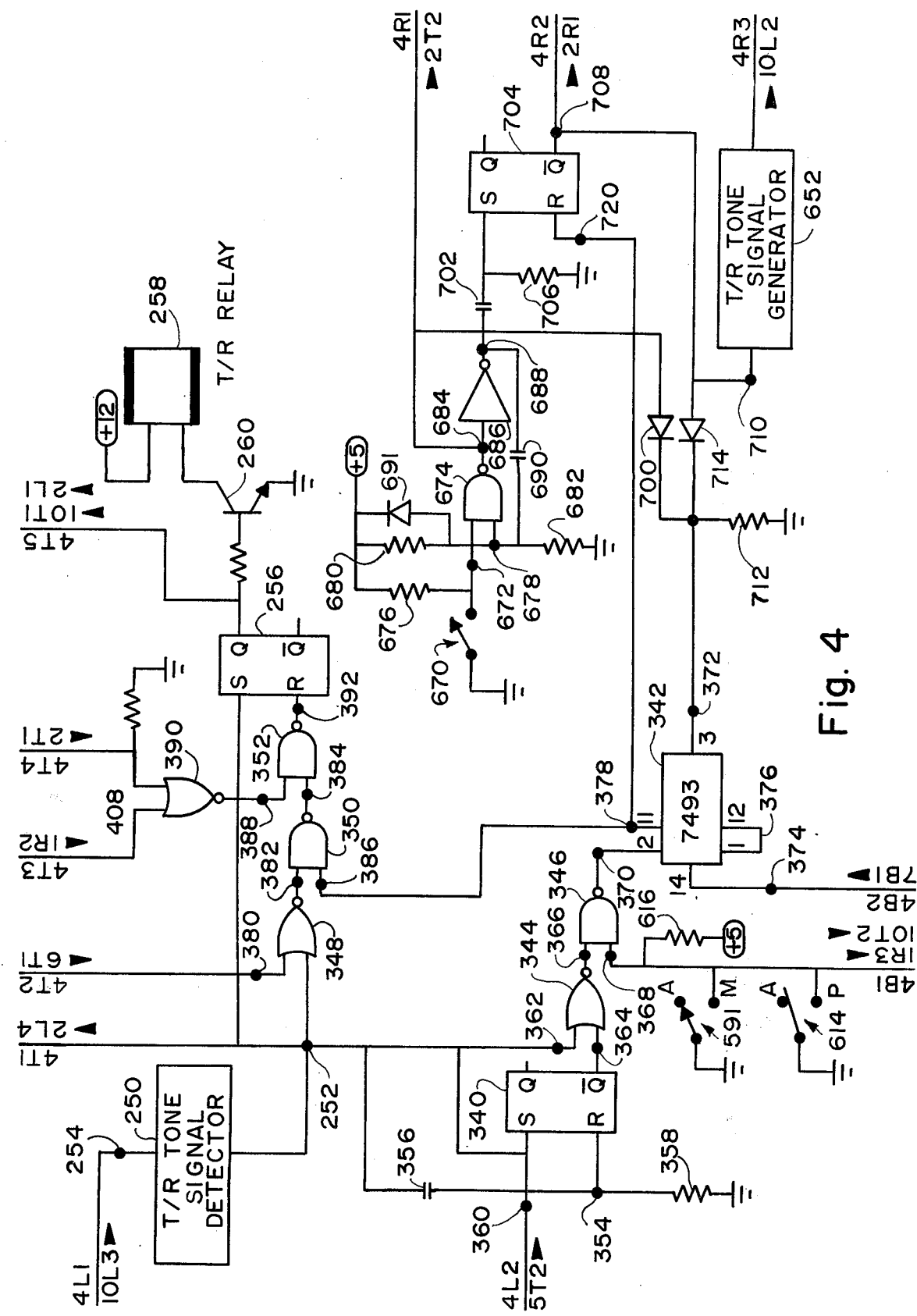
FIG. 4 is a schematic diagram of the transmit/receive control and transmit/receive tone record control circuits of the preferred embodiment of my invention.

Referring to FIG. 4, the transmit/receive control circuit of the preferred embodiment will not be discussed.

T/R tone signal detector 250 serves to produce at output terminal 252 an L1 signal whenever and as long as a T/R tone signal is being received at input terminal 254; the signal at output terminal 252 being at all other times at the L0 level. Circuits for fulfilling this function, such as a phase-locked loop tone detector, will be provided by those having ordinary skill in the art without the exercise of the invention.

Said signal at terminal 252 is directly applied to the set (S) terminal of flip-flop 256 (sometimes called the T/R FF herein). When flip-flop 256 is set by said signal at point 252 relay 258 (sometimes called the T/R RLY) is energized via transistor 260. As will be hereinafter described relay 258 serves to energize the incoming tape transport drive motor. Relay 258 also serves to reconnect the voice amplifier VA (FIG. 10) so as to amplify received speech from the telephone line for recording on the incoming message tape of the device of the preferred embodiment.

It will be recognized that at the beginning of the T/R tone signal the voice amplifier circuitry is switched so as to receive incoming messages, rather than transmit outgoing messages. Therefore, the T/R tone recorded on the outgoing message tape is not transmitted to the caller. The brief time period which the T/R tone signal detector requires to detect the T/R tone signal is not sufficient for the caller to perceive the presence of the tone before switching occurs. Thus, all control tones are prevented from being perceived by the caller.

As may be seen by comparison of FIGS. 4 and 2 the T/R logic signal at point 252 impressed upon input terminal 262 of NOR gate 264 (FIG. 2) via interconnection 4T1-2L4.

As will now be described in detail, the T/R logic signal, subject to the condition imposed by gate 264, serves to reset flip-flop 206, and thus stop the outgoing message transport when the T/R logic signal at point 262 returns to its L0 level, i.e., when the end of the T/R tone signal arrives at the tape head coacting with the outgoing message tape.

Said condition imposed by gate 264 is represented by the signal impressed upon terminal 266. As may be seen by following interconnection 2L3–1R2 to FIG. 1, this signal is derived from the Q terminal flip-flop 130 via manually operated switch 270, which will be assumed to be set to its A or "answer" position for the purposes of this discussion. It can be seen, then, in light of the discussion of flip-flop 130 hereinabove, that the signal on gate terminal 266 is at L0 level whenever the telephone line is seized and is at its L1 level whenever the telephone line is not seized.

Referring now to FIG. 2, it can be seen that the signal an output terminal 272 of NOR gate 264 will be at L0 level except when the telephone line is seized and the T/R logic signal at point 252 is L0. Putting the matter in alternative form, the signal at terminal 272 is L1 only when the telephone line is seized and the tone detector does not indicate the presence of a T/R tone signal.

The network consisting of resistor 274; capacitor 276, and diode 278 functions to produce a position-going pulse at point 280 when and only when a transition from L0 to L1 occurs at output terminal 272 of NOR gate 264. It will be evident to those having ordinary skill in the art from the above discussion that said pulse at point 280 occurs only at the trailing edge 282 of a T/R tone signal (as received at the tape head coacting with the outgoing message tape), and when, at the same time, the telephone line is seized. As may be seen from FIG. 2, this pulse resets flip-flop 206, and thereby de-energizes the outgoing message tape transport drive motor.

It will be recognized by those having ordinary skill in the art that resistor 284 (FIG. 2) serves to maintain the reset input to flip-flop 206 at L0 except when point 280 is forced to L1, as by the aforedescribed signal from the output of the network comprised of resistor 274, capacitor 276, and diode 278. Resistor 286 functions in a similar manner to maintain the set terminal of flip-flop 206 at L0 except when forced to L1.

Considering a pulse to have just occurred at point 280, during line seizure, thereby stopping the outgoing message tape transport drive motor, and the incoming message tape drive motor to have been previously started, as described above, and the incoming message circuits also conditioned to receive and record incoming messages from the calling party, the further operation of the device of the preferred embodiment will now be described.

It is a characteristic feature of the preferred embodiment of the present invention that in the state of operation just described (i.e., machine ready to receive incoming message) the calling party must speak within a predetermined interval of time (e.g., 8.5 seconds) or the device will disconnect itself from the talking circuit of the telephone line and reset itself to receive the next incoming call.

This function is carried out in response to a signal produced by the no-response timer shown in FIG. 1, working in conjunction with the Syllable Detector of FIG. 5, as will now be described.

SYLLABLE DETECTOR

Referring now to FIG. 5, it should first be noted that the input signal at input terminal 290 of the syllable detector of FIG. 5 is derived from the output of voice amplifier VA, which amplifies all voice signals, both incoming and outgoing.

The band pass filter network 292, consisting of diode 294, resistors 296 and 298, capacitors 300 and 302, and resistor 304 serves to pass the syllabic frequencies of incoming voice signals, while rejecting higher frequency components and constant tones. The syllabic frequencies are typically of the order of 1 to 10 cycles per second. Thus, the signal appearing at input terminal 306 of operational amplifier 308 is an AC signal having peaks which generally correspond in time to the syllables of the voice signal received at terminal 290.

Non-inverting terminal 310 of operational amplifier 308 is normally biased to some slightly negative voltage. By means of the adjustable voltage divider consisting of potentiometer 312 and resistor 314. It may be seen from FIG. 5 that operational amplifier 308 is connected as an open loop comparator. Thus, the output signal at output terminal 316 of operational amplifier 308 remains negative except when the voltage at input terminal 306 becomes more negative than the threshold voltage applied to input terminal 310. When the voltage at input 306 exceeds (negatively) the voltage at terminal 310, the output at terminal 316 switches to the positive output saturation level of operational amplifier 308. When the threshold determined by potentiometer 312 is correctly set, substantially each syllable of the incoming voice signal at terminal 290 results in a positive-going pulse at operational amplifier output terminal 316. Resistor 318 serves to limit the current flowing from terminal 316.

An additional feature of the syllable detector of FIG. 5 is the connection including capacitor 320. By means of this connection a positive-going signal received via interconnection 5T1–1R1 (from FIG. 1) when line seizure takes place is converted to a positive-going pulse by capacitor 320, and then applied to non-inverting input terminal 310 of operational amplifier 308. This pulse acts as a "false syllable," producing a positive-going output signal at point 316, and thereby resetting the non-response timer 180 of FIG. 1 to zero at line seizure, i.e., early in each answering cycle.

As will be recalled from the above discussion of the no-response timer (FIG. 1), the no-response timer emits a signal which results in the disconnection of the device of the preferred embodiment, and its resetting to receive the next incoming message, after a predetermined interval (e.g., 8.5 seconds), unless during that interval the no-response timer is reset by an L1 pulse signal from the output of the syllable detector (5T2–1R5). Thus it may be seen that by the coaction of the no-response timer (FIG. 1) and the syllable detector (FIG. 5) the device of the preferred embodiment incorporates the condition that if the calling party is continuously silent for more than a present interval, say, 8.5 seconds, at any time when the device is conditioned to receive incoming messages, the device will disconnect itself from the talking circuit of the telephone line, and reset itself to receive the next incoming call.

CALLER PAUSE CIRCUIT

In accordance with a further feature of the preferred embodiment of the present invention a caller pause circuit is provided, which monitors incoming messages from the caller to determine when a pause of predetermined duration, e.g., 2 seconds, occurs; which pause is taken by the device of the preferred embodiment to be an indication that the caller has completed his response to the previous outgoing message.

Means are incorporated in the pause circuit whereby it can operate only after the caller has made an initial response to the previous outgoing message (as detected by the above-described syllable detector circuit) and when there are outgoing messages remaining on the outgoing message tape to be transmitted to the caller.

When the caller pause circuit has detected a pause in the incoming message from the caller, as described immediately above, it causes the device of the preferred embodiment to deliver the next outgoing message to the caller.

The caller pause circuit generally comprises (FIG. 4) initial response flip-flop 340, caller pause/tone timer 342, and gates 344, 346, 350, and 352.

Referring now to initial response flip-flop 340 it will be seen (FIG. 4) that reset terminal 354 thereof is connected to the aforesaid point 252, which is the output of the T/R tone signal detector. By this means initial response flip-flop 340 is reset each time the device of the preferred embodiment is made ready to receive an incoming message from the caller. Capacitor 356 in said connection serves to transmit only momentary pulses to the reset terminal of flip-flop 340 from point 252. Resistor 358 serves, in the well-known manner, to maintain the reset terminal of flip-flop 340 at L0 level except when an L1 pulse is received from point 252 via capacitor 356.

As may be seen in FIG. 4, the set terminal of flip-flop 340 is connected to interconnection 4L2–5T2. By reference to FIG. 5 it will be seen that the signal received at terminal 360 is the output signal from the above-described syllable detector. The syllable detector output signals applied to the set terminal 360 of the initial response flip-flop 340 drive the flip-flop to its set state. Thus it may be seen that the first syllable of an incoming message sets the initial response flip-flop, which remains set until after the device of the preferred embodiment has transmitted the next outgoing message, and is readied to receive the subsequent incoming message from the caller.

As may be seen in FIG. 4, the upper terminal 362 of NOR gate 344 receives the output signals from the syllable detector, and the lower terminal 364 of NOR gate 344 receives signals from the Q terminal of initial response flip-flop 340.

The construction of NOR gate 344 is such that its output terminal 366 will manifest an L0 signal when and only when either or both of its input terminals 362 and 364 are at L1, i.e., if the caller has not yet spoken since the device of the preferred embodiment was prepared to receive a particular incoming message or if the caller is currently speaking.

As will be explained hereinbelow, terminal 368 of NAND gate 346 is at L1 during the recording of an incoming message from a caller. Thus, during the recording of an incoming message, the output signal at output terminal 370 of gate 346 is the inverse of the signal at input terminal 366, i.e., L0 when the input signal is L1, and L1 when the input signal is L0.

Thus it will be seen that the signal at terminal 370 will be at L1 level if the caller has not yet responded after the device of the preferred embodiment has been conditioned to receive a particular incoming message or if the caller is currently speaking in response.

Going now to caller pause/toner timer 342, which in the preferred embodiment is a TTL four-stage binary integrated circuit counter of the 7493 type, it will be known to those having ordinary skill in the art that it is a property of the 7493 integrated circuit counter that the counter is reset to its zero count state, and remains in that state, if both integrated circuit terminals 2 and 3 (terminals 370 and 372) are and remain at L1.

As will be described in detail hereinbelow, terminal 372 of counter 342 remains at L2 throughout all incoming message recording intervals.

Thus, it will be seen that whenever terminal 370 is at L1, counter 342 will be held in the reset (zero count) state.

Counter 342 is supplied with clock pulses from the master clock of FIG. 7 via input terminal 374. These clock pulses occur in the preferred embodiment at a substantially fixed repetition rate, e.g., 4 pulses per second.

As will be recognized by those having ordinary skill in the art, short connection 376 serves to interconnect the independent stage and the three coupled stages of the 7493 integrated circuit counter into a single four-stage binary counter.

The output signals of counter 342 are produced at integrated circuit terminal 11 (terminal 378).

It will be evident to those having ordinary skill in the art that if counter 342 is not reset to its zero count stage during any continuous time interval equal to the time required to receive eight incoming clock pulses at terminal 374, then the output signal at terminal 378 will switch from L0 to L1. This output signal brings about the transmission of the next outgoing message from the outgoing message tape to the caller, if any outgoing messages remain to be transmitted.

Going now to the NOR gate 348 (FIG. 4) it will be seen that the signal on input terminal 252 of this gate is the aforedescribed output signal of the T/R tone signal detector, which is L1 whenever a T/R tone signal is being detected. Terminal 380 receives its signal from the output of the outgoing loop home position detector of FIG. 6, via interconnection 4T2–6T1. This signal is at L1 level when and only when the outgoing message tape loop is at its home position.

As will be seen by those having ordinary skill in the art of logical circuits, the output of NOR gate 348 will be at L1 level only when both of its input terminals are at L0 level, i.e., when the outgoing message tape is not at its home position and when no T/R tone signal is being detected.

Going now to NAND gate 350, the output terminal 384 of which is at L0 only when both input terminals 382, 386 are at L1 level, it may be seen that output terminal 384 will be at L0 only when the outgoing message tape is not in its home position, when there is no T/R tone signal being detected, and when the caller pause/tone timer 342 indicated by the L1 state of its output terminal that the caller has commenced speaking during an incoming message receipt interval, but has subsequent paused continuously for more than the predetermined pause interval (e.g., 2 seconds).

It will be evident from the above disclosure that this condition will come, in general, only when the outgoing message tape loop is at rest and the outgoing tape head is positioned at the beginning of the next outgoing message, i.e., within one of the intervals designated as 238, 240, 242, and 244 in FIG. 3.

Going now to gate 352 (FIG. 4) it will be seen that the input terminal 388 thereof receives its signal from the output of gate 390. As will be described hereinbelow, the output signal of gate 390 remains at L1 throughout the automatic answering cycle, which includes all of the incoming message receipt intervals.

Thus it will be seen that the output of gate 352, at terminal 392, will switch to L1 whenever the input at terminal 384 (during an answering cycle) switches to L0. It follows that terminal 392 goes to L1 (during an incoming message interval) only when the outgoing message tape is positioned so that the tape head is at the beginning of an outgoing message and the caller has made some response to the previous outgoing message but has paused for a continuous period which exceeds said predetermined pause interval.

As will be seen in FIG. 4 the output signal from gate 352 is applied to the reset terminal of the aforedescribed flip-flop 256. Thus it will be seen that flip-flop 256 will be reset when the output signal at terminal 392 goes to L1.

Figure 10:
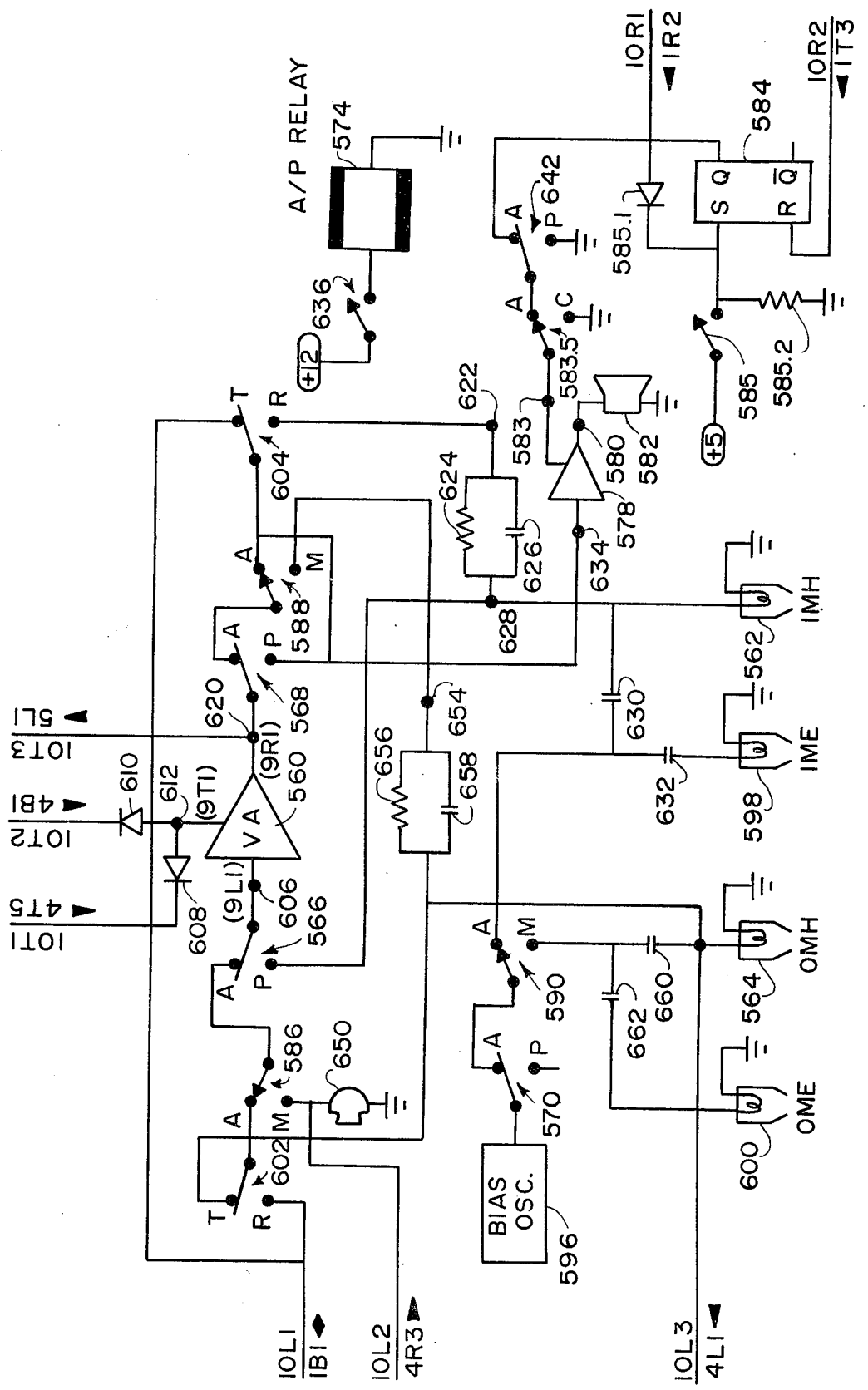
FIG. 10 is a schematic diagram of the voice amplifier and tape head circuit of the preferred embodiment of my invention.

At the resetting of flip-flop 256 relay 258 will be deenergized by the turning off of transistor 260, whereby the voice amplifier circuit of FIG. 10 will be conditioned to transmit the next outgoing message.

At the same time (by the fact that the Q terminal of flip-flop 256 goes to L0) a L0 signal is produced on interconnection 4T5–2L1. Reference is now had to FIG. 2, terminal 2L1, which is also input terminal 394 of NOR gate 396.

The other input 398 of NOR gate 396 is connected to the output of the outgoing message tape home position sensor (FIG. 6) which provides an L1 signal whenever the outgoing message tape loop is at its home position.

It will be evident to those having ordinary skill in the logic circuit art, as taught by the above disclosure, that the output signal at terminal 400 of NOR gate 396 will go from its L0 to its L1 state whenever the outgoing message tape is in its home position and the flip-flop 256 switches from its set state to its reset state. This will occur when it is appropriate to transmit the next outgoing message, as indicated by the immediately previously described conditions.

Upon occurrence of this transistion at terminal 400 an L1 pulse is produced at the set terminal 204 of flip-flop 206 by the network consisting of resistor 402, capacitor 404, and diode 406. This pulse sets flip-flop 206, thus energizing the output message tape transport drive motor in the manner hereinabove described.

As will be evident to those having ordinary skill in the art from consideration of the above disclosure, the above described alternation of outgoing and incoming messages will be carried out repeatedly until (a) the last outgoing message has been transmitted to the caller, or (b) the caller hangs up, or (c) the present maximum answering cycle time has elapsed, or (d) the user breaks into the automatic answering cycle as described above, or (e) the caller remains silent instead of responding to an outgoing message, whichever occurs first.

As may be seen from FIG. 3 T/R tone signal 236 is recorded on the outgoing message tape continuously from the end of the last outgoing message to the home position indicating means 246. As described above, this T/R tone signal results in the input terminal 252 of gate 348 (FIG. 4) being in the L1 state, which in turn prevents flip-flop 256 from being reset, by means of gates 348, 350, and 352, thus preventing the voice amplifier from being switched from its receive state to its transmit state, and also prevents the outgoing message transport drive motor from being stopped. It follows that after the last recorded outgoing message the outgoing tape will be transported to its home position without interruption and the transmit/receive control circuit will ignore any pause in the caller's incoming message which would ordinarily cause the transmission of the following outgoing message. Once the outgoing message tape is at its home position the home position detector causes an L1 signal to be present on terminal 380 (4T2-6T1) which similarly prevents T/R flip-flop 256 from being reset.

In the abovesaid condition (b), i.e., caller hangs up before the last outgoing message is transmitted, a calling party disconnected signal is produced as described above, and the device of the preferred embodiment disconnected from the talking circuit of the telephone line, and reset to receive the next incoming call.

The resetting of the device of the preferred embodiment in preparation for receiving the next incoming message will now be described.

As has been previously described, the resetting of flip-flop 130 (FIG. 1) in response to a disconnect signal causes the Q output terminal (terminal 136) to go to L1.

The signal at terminal 136 is directly coupled through switch 270 (FIG. 1) during automatic answering, via interconnection 1R2-4T3, to input terminal 408 of gate 390 (FIG. 4). When this terminal (408) goes to L1 the output at terminal 388 goes to L0, and thus, via gate 352, causes the resetting of flip-flop 256, which in turn de-energizes relay 258 and restarts the outgoing message tape drive motor, as hereinabove described, unless the outgoing message tape is already in its home position. Once started, the outgoing message tape continues to run until it reaches home position, whereupon the output of the home position detector (FIG. 6) goes to L1. This output signal is applied to point 410 via interconnection 2L2-6T1 (FIG. 2). The network ocmprising resistor 412, capacitor 414, and diode 416 serves to produce an L1 pulse at point 418 whenever the signal at point 410 goes from L0 to L1.

This L1 pulse resets flip-flop 206, and thus stops the outgoing message tape drive motor, as hereinabove described.

It should be noted that when the device of the preferred embodiment is reset to its ready-to-receive-call state before all of the recorded outgoing messages have been transmitted the T/R control circuit of FIG. 4 must be adapted to ignore tone signals (e.g., 234, 236) reproduced in passing from the outgoing message tape as it is driven to its home position. This capacity to ignore these T/R tone signals is brought about as follows.

As pointed out above, an L1 disconnected signal applied and maintained on terminal 4T3-1R2 results in applying and maintaining an L1 signal at the reset terminal 392 of flip-flop 256. Flip-flop 256 is a TTL RS flip-flop, which may be provided by interconnecting two suitable NOR gates in the well-known manner. It is a property of such a flip-flop that if both its set and reset terminals are simultaneously in the L1 state, then both of its output terminals, i.e., its Q and Q terminals, will be at L0 level.

Since, as just indicated, the reset terminal of flip-flop 256 is maintained at L1 during disconnect, it follows that L1 signals impressed on the set terminal of this flip-flop flop as a result of T/R tone signals, as previously described, will have no effect on the output at the Q terminal of this flip-flop. Since this Q terminal is already in its L0 state it will remain in this state dispite incoming signals from the T/R tone signal detector 250, which would otherwise bring about a transition to the L1 level and thus energize relay 258, inappropriately starting the incoming message tape transport motor, and also inappropriately preparing the device to receive incoming messages.

As described above, the outgoing message tape drive motor is stopped at the trailing edges 282 (FIG. 3) of the T/R tone signals during the normal progress of the answering cycle. After disconnection from the talking circuit of the telephone line has occurred, however, and while the outgoing message tape is being reset to its home position, it is necessary to avoid this stopping of the outgoing message tape transport drive motor.

As described above, the stopping of the outgoing tape transport drive motor occurs during the normal answering cycle as a result of a transition from an L1 signal to an L0 signal applied to input terminal 262 of gate 264 (FIG. 2). The transistor occurs at the trailing edges 282 of the T/R tone signals, as described above. However, after disconnection has occurred input 266 to gate 264 is maintained at the L1 level because terminal 2L3 is connected via interconnection 2L3-1R2 and switch 270 to the Q terminal 136 of flip-flop 130. With one of its terminals (i.e., 266) maintained in the L1 state the output of gate 264 is maintained in its L0 state, thereby preventing the generation by network 274, 276, 278 of a pulse signal which would reset flip-flop 206, and thereby stop the outgoing message tape transport drive motor.

Returning now to the disconnect-and-reset-causing conditions (c), (d), and (e), described above, it will be understood from the above disclosure that each of these conditions results in a disconnect signal, as does condition (b). It follows that the above discussion relating to the disconnection and resetting of the device of the preferred embodiment under conditions (b) applies also in the case of conditions (c), (d), and (e).

THE OUTGOING MESSAGE TAPE HOME POSITION DETECTOR

Referring now to FIG. 6 it will be seen that the outgoing message home position detector referred to hereinabove comprises a phototransistor 430 (which may be of the well-known type) and inverter 432 of the type described hereinabove, and a resistor 434. Phototrasistor 430 is so disposed with respect to the outgoing message tape and a light source (not shown) as to receive only light reflected from the outgoing message tape. When the home position marking means 246 (FIG. 3) (e.g., highly reflective metallic foil cemented to the outgoing message tape) comes into such position that light from said light source is reflected by it onto phototransistor 430, the light flux falling on phototransistor 430 is greatly increased, the tape itself being of a dark color. and thus the current carried by phototransistor 430 is itself greatly increased. This increase in the current passed by phototransistor 430 results in a transition to an L1 signal at the output terminal 436 of inverter 432. The signal at point 436 is applied, via interconnection 6T1–1T1, etc., to the circuits shown and described above for the purposes there set out. Other home position sensing circuits and means will occur to those having ordinary skill in the art without the exercise of invention.

Also shown in FIG. 6 is the ready light circuit comprising resistor 438, transistor 440, resistor 442, and a lamp 444. This circuit serves to light lamp 444 whenever the outgoing message tape is in its home position, and thus to inform the user of this device of this fact.

FIG. 7 shows the master control clock of the device of the present embodiment. The clock circuit comprises type 7493 integrated circuit counters 450, 452, 454, and 456, each of which is caused to operate as a four-stage binary counter by means of short circuit connections 458, 460, 462, and 464. These counters are interconnected in the well-known manner to provide a sixteen-stage binary counter 470, which generally provides timing signals for other circuits of the device of the preferred embodiment.

Counter 470 is driven by the 60-cycle per second line frequency derived from 6.3 VAC terminal 462. A pulse-shaping network comprising resistor 474, capacitor 476, diodes 478 and 480, and resistor 482 serves to shape incoming 60 cycle per second sine waves from terminal 472 into suitable input impulses to drive counter 470 via input terminal 484. The reset terminals of all of the counters 450, 452, 454, and 456 are connected together at point 486 for resetting of the counter by pulse signals appearing at point 486.

As previously pointed out, counter 470 is reset at the time of each line seizure by the device of the preferred embodiment.

At this time an L0 signal is applied to terminal 488 of NAND gate 489 via interconnection 7L1–1T2. Terminal 490 of NAND gate 489 is maintained at the L1 level by contact set 491 of the A/P relay throughout the answering cycle of the device of the preferred embodiment. During the playback mode referred to hereinbelow terminal 490 of gate 489 is maintained in the L0 condition. It will be evident to those having ordinary skill in the art that an L0 signal appearing either at terminal 488 or at terminal 490 of gate 489 will result in an L1 signal at terminal 486, thereby resetting counters 450, 452, 454, and 456, and maintaining them in the rest condition throughout the duration of the L1 signal appearing at terminal 486. Thus it will be seen that the master clock is reset at the beginning of each answering cycle, and is reset and maintained reset throughout operation in the playback mode.

Also shown in FIG. 7 is a switch 492 by means of which one of several signals characterized by different repetition rates may be selected. As discussed, the selected signal is used to determine the maximum duration of the answering cycle, and this duration may be varied by means of switch 492.

Referring again to FIG. 7, it will be seen that terminal 7B1 is supplied with output pulses of an intermediate repetition rate (e.g., 4 cycles per second), these pulses are utilized as described hereinabove.

Similarly, terminal 7B2 is supplied with pulses of a lower intermediate repetition rate (e.g., 1 pulse per second), which pulses are utilized as described hereinabove.

FIG. 9 shows a voice signal amplifier of a type suitable for use in the device of the preferred embodiment.

Voice signals received at terminal 9L1 are amplified by operational amplifier 500. The network comprising resistors 502, 504, and 506, and capacitors 508 and 510, serves to control the gain of operational amplifier 500 as a function of the input signal frequency in the well-known manner. It is to be noted, however, that transistor 512, constituting a part of said network, serves as a swtich to disconnect the combination of resistor 506 and capacitor 510 from the remainder of this network, thus altering the gain versus frequency characteristics of operational amplifier 500. This change in amplifier characteristics is necessary in order to allow for the well-known difference in gain versus frequency characteristics as between magnetic tape recording and magnetic tape reproduction.

Resistors 514, 516, and 518 together provide a biasing network by means of which transistor 512 is biased to its non-conducting state when terminal 9T1 is maintained at L0, and transistor 512 is biased to its conducting state when terminal 9T1 is maintained at L1.

It will thus be evident to those having ordinary skill in the tape recording art that when terminal 9T1 is maintained at the L0 level, thus maintaining transistor 512 in its off or non-conducting state, amplifier 500 will be conditioned for amplifying signals to be used for recording on magnetic tape. Conversely, when terminal 9T1 is maintained at the L1 level transistor 512 is maintained in its conducting state, and amplifier 500 is conditioned for amplifying voice signals reproduced from magnetic tape.

Capacitor 520 serves to couple the first amplifying stage (including operational amplifier 500) to a second amplifying stage (including operational amplifier 522).

The network comprising resistors 524 and 526, and capacitor 528, is a feedback network which determines the gain versus frequency characteristic of operational amplifier 522. In addition, the network comprising elements 530, 532, 534, 536, 538, 540, 542, 544, and 546 constitutes an automatic gain control network. This automatic gain control network is highly desirable because incoming voice signals on the telephone line may vary greatly in power level.

FIG. 9A shows a schematic symbol which represents the voice amplifier circuit of FIG. 9, the corresponding terminals of FIG. 9 being indicated in parentheses in the drawing.

FIG. 8 shows the relay circuit by which the incoming message tape transport drive motor 550 (IMM) is proximately controlled. As will be understood by those having ordinary skill in the art, it is indicated by this figure that the energization of either relay 552 of 554 (i.e., the T/R relay or the A/P relay) will result in energizing motor 550.

Referring now to FIG. 10 there is shown the voice amplifier of the preferred embodiment, its associated switching network, and the tape heads of the device of the preferred embodiment.

It will be understood that the triangle 560 containing the expression VA represents the voice amplifier circuit shown in FIG. 9.

As pointed out above, the switching network associated with voice amplifier 560 serves to adapt voice amplifier 560 for either (a) amplifying voice signals to be supplied to tape head 562 or tape head 564, or (b) amplifying voice signals derived from tape head 562 or tape head 564.

Before discussing this switching network in detail it should be noted that the switching contact sets 566, 568, and 570 of relay 574 (the "answer/playback relay" also sometimes called the A/P RLY) are used only in switching from the automatic answering mode of operation of the device of the preferred embodiment to playback mode of operation of the device of the preferred embodiment, which allows the user to retrieve and review previously recorded incoming messages. Since the playback mode of operation of the device of the preferred embodiment does not constitute a part of the present invention, it will be assumed in the following discussion that relay 574 remains de-energized, i.e., that the moving contacts of all of the relay contact sets 566, 568, 570, and 572 remain the contact with the fixed contacts marked A, which are associated with the automatic answering mode of operation.

The speaker amplifier 578 is an audio-amplifier the provision of which is within the scope of the one having ordinary skill in the art. Output terminal 580 of speaker amplifier 578 is connected to supply driving current to the internal loudspeaker 582 of the device of the preferred embodiment. The signal supplied to speaker amplifier 578 by terminal 583 is a logic signal. When this logic signal is at L1 level speaker amplifier 578 is rendered inoperative, and when this logic signal is at LO the speaker amplifier 578 is operative.

Such a squelch means as is connected to terminal 583 within amplifier 578 to accomplish the function described immediately above will be provided by those having ordinary skilled in the art without the exercise of invention. Said logic signal on terminal 583 is derived from the Q terminal of line seizure flip-flop 130 (FIG. 1), via switch 270, and thus it will be seen that this signal serves to render amplifier 578 inoperative except when an automatic answering cycle is in progress and the monitor squelch circuit (see below) has not been invoked, or when the user of the device is checking an output tape, in the manner hereinafter described.

MONITOR SQUELCH CIRCUITS

In accordance with a further feature of the present invention a monitor squelch circuit is provided, which serves, upon momentary closure of a suitable manually operated switch by the user of the device of the preferred embodiment, to silence the output loudspeaker 582 only during the course of the automatic answering cycle during which said switch is manually closed, the operation of the output speaker 582 being automatically restored for the next answering cycle.

The monitor squelch circuit principally comprises flip-flop 584, also sometimes called the MS FF, switch 585, diode 585.1, and resistor 585.2, all shown in FIGS. 10.

As may be seen in FIG. 10, and L1 signal is supplied via interconnection 10R2–1T3 at the start of each answering cycle, in the manner previously described, serving to reset the monitor squelch flip-flop 584. This action causes an LO signal to be applied to circuit point 583, thereby activating speaker amplifier 578, in the manner previously described. If during the course of an automatic answering cycle the user of the device of the preferred embodiment desires to suppress or squelch the audible output from loudspeaker 582, he need merely momentarily close which 585, thereby causing an L1 signal to appear on the set terminal of flip-flop 584, causing its Q terminal to go to its L1 state. Said L1 signal (at the Q terminal of flip-flop 548) is transmitted via relay contact set 642, and switch contact set 585.3, speaker amplifier squelch terminal 583, thereby rendering the speaker amplifier 578 inoperative, in the manner hereinabove described. It will be recognized that, as described above, flip-flop 584 will be reset automatically at the beginning of the next automatic answering cycle, thus again rendering the speaker amplifier operative. Additionally, flip-flop 584 is set by means of an L1 signal transmitted via interconnection 10R1–1R2 from the Q terminal of line seizure flip-flop 130 (FIG. 1) at the termination of each automatic answering cycle. Diode 585.1 serves to prevent an L1 signal from appearing on interconnection 10R1—1R1 when switch 585 is closed by the user of the device of the preferred embodiment. Resistor 585.2 serves to maintain the set terminal of flip-flop 584 in its LO state unless forced to L1, as previously described. A/C switch contact set 585.3 serves to enable or render operative the speaker amplifier 578 during the mode of operation in which the user checks the information recorded on the outgoing message tape loop. Similarly, relay contact set 642 serves to render the speaker amplifier operative when the user is playing back or retrieving previously recorded incoming messages. It will be understood by those having ordinary skill in the art that a plurality of remote speakers, each provided with an on-off switch and a volume control, and a monitor squelch circuit similar in operation to the just-described switch 585, may be provided by those having ordinary skill in the art without the exercise of invention.

The contact sets 586, 588, 590, (FIG. 10), 591 (FIG. 4), and 60 (FIG. 1) of the manually operated Answer/Make switch of the device of the preferred embodiment (sometimes denoted by the expression A/M SW) are mechanically ganged for simultaneous operation.

A/M SW switch permits the user of the device to switch from the automatic answering mode of operation to the outgoing message tape making mode of operation, i.e., a mode of operation of the device in which the user may record new outgoing messages and associated control tones (i.e., T/R tone signals) on the outgoing message tape loop. It will be assumed for purposes of the present discussion that the Answer/-Make switch is in the A (answering cycle) position, in which the moving contact of each of said contact sets is in contact with the A fixed terminal.

Bias/Erase oscillator 596 provides an AC bias signal to the recording heads 562 and 564 during recording operations, and also provides an AC signal to the tape erase heads 598 and 600 during the same recording operations, in the well-known manner.

Relay contact sets 602 and 604 of the Transmit/-Receive relay shown in FIG. 4 will for the next portion of this discussion be considered to be in the relay de-energized position, in which the moving contacts are in contact with the fixed contacts marked T. Further, it will be assumed that an automatic answering cycle is in progress. It will be recognized by those having ordinary skill in the art, informed by the present disclosure, that when the just recited conditions obtain the device of the preferred embodiment is conditioned to transmit outgoing messages.

It may then be seen from FIG. 10 that the voice amplifier input terminal 606 is deriving its signal from outgoing message tape head 564 via relay contact set 602. (Switch 586, as assumed above, is in its A position; and relay contact set 566, as assumed above, is in its A position.)

As has been explained above, an LO signal is now provided at terminal 10T1, which signal is derived from the Q terminal of T/R flip-flop 256 (FIG. 4).

Before discussing the effect of this LO signal at terminal 10T1 it should be noted that the anodes of diodes 608 and 610 are joined at a common point 612. It follows that if either terminal 10T1 or terminal 10T2 is at LO level, then point 612 will be at LO level. Otherwise point 612 will be at some higher positive voltage as determined by the voltage divider network comprising resistors 514, 516, and 518. (FIG. 9).

Referring now to FIG. 4 and particularly to contact sets 591 and 614, which are connected to terminal 10T2 via interconnection 10T1-4B1, it will be seen that during any automatic cycle contact sets 591 and 614 will be in their respective A positions (i.e., terminal 4B1 not grounded) and, therefore, terminal 4B1, and terminal 10T2, will be maintained at L1 level, by reason of the connection of terminal 4B1 to the plus 5 volt supply via resistor 616. It will be evident from the above discussion that terminal 612 of voice amplifier 560 (FIG. 10) will be at the LO level throughout the outgoing message transmission intervals of any automatic answering cycle. It will further be evident from the discussion of FIG. 9 that when terminal 612 is at its LO level the gain versus frequency characteristic of amplifier 560 will be suitable for reproduction of voice signals from magnetic tape heads.

Interconnection 10T3-5L1 provides an output signal from the output terminal 620 of voice amplifier 560 to the syllable detector circuit of FIG. 5.

The output signal at terminal 620 is also connected, via contact sets 568, 588, and 604, and via interconnection 10L1-1B1 to secondary winding 27 of line transformer 26, thereby coupling the output signal from voice amplifier 560 to the talking circuit of the telephone line with which the device of the preferred embodiment is associated.

It will be recalled from the above discussion that at the end of an outgoing message the telephone answering device of the invention is then automatically conditioned by energization of the T/R relay coil 258 (FIG. 4) to receive incoming messages from the caller. Assuming, therefore, that the T/R has been energized, it will be understood that the moving contacts of contact sets 602 and 604 are now in contact with their fixed contacts marked R.

It will now be seen that the secondary winding 27 of line transformer 26 (FIG. 1) is connected via interconnection 1B1-10L1, through contact sets 602, 586, and 566, to input terminal 606 of voice amplifier 560. Further, the signal at terminal 10T1 will now be at L1 level as a result of its connection via interconnection 10T1-4T5 to the Q terminal of flip-flop 256 (FIG. 4). This being so, the voice amplifier 560 is conditioned for the recording of voice signals on magnetic tape.

In this state of operation of the T/R relay (energized), wherein the moving contacts thereof are in contact with fixed contacts R, and thus voice amplifier 560 is connected for receiving incoming messages, the output of voice amplifier 560 is connected as before by interconnection 10T3-5L1 to the input of the syllable detector of FIG. 5. As seen by inspection of FIG. 10, it is connected via contact sets 568, 588, and 604 to input terminal 622 of the network comprising resistor 624 and capacitor 626, which network serves as a record equalization network, in the well-known manner. The output at terminal 628 of this network is directly connected to the incoming message tape head 562. Also connected to incoming message tape head 562 is capacitor 630, which serves to supply an AC bias signal to the tape head (562) during recording. This bias signal is derived from the bias/erase oscillator 596 via contact set 570 and 590.

Simultaneously, the AC bias signal is applied, through capacitor 632, to the incoming message erase head 598, which serves to erase previously recorded messages from the incoming message tape.

It will be seen from FIG. 10 that the output terminal 620 of the voice amplifier 560 connected via contact sets 568 and 588 to the input terminal 634 of speaker-amplifier 578 during any automatic answering cycle. This allows the user of the device to monitor the progress of any answering cycle by means of loudspeaker 582. Since the user can thus monitor all incoming calls being received by the device, he will be prepared to intercept or break into any incoming call, at an appropriate position which he may select as a result of thus monitoring.

INCOMING MESSAGE PLAYBACK

While a commercial version of the device of the preferred embodiment is equipped with means for remotely, by telephone, playing back, in response to predetermined voice signals, and listening to all incoming messages previously recorded on the incoming message tape, this remote playback system does not constitute a part of the present invention, and so is not shown and described herein. Rather, only the means for playing back and reviewing the recorded incoming messages at the site of the device of the preferred embodiment will be described herein, as follows. It is to be understood, however, that while the operation of said remote playback system may involve the transmission of non-speech (e.g., "beep" tone) signals to the caller, the device of the preferred embodiment does not transmit non-speech signals to the caller during its answering mode of operation.

Referring to FIG. 10 it will be seen that the coil 574 of the Answer/Playback (A/P) relay may be energized by closing manual switch 636. When this is done the device is conditioned to play back the incoming messages which have previously been recorded. In addition, mechanical means (not shown) are provided as part of the device of the preferred embodiment, whereby the user may rewind and otherwise control the movement of the incoming message tape in the playback mode. As may be seen in FIG. 8, contact set 554 will be in its P circuit-closed state when the A/P relay coil is energized, thereby providing power to the incoming message tape transport drive motor (IMM) 550, making it possible to control this motor, and the movement of the incoming message tape, by way of said mechanical means.

It will be seen from FIG. 1 that contact set 64 of the A/P relay serves to ground the input terminal 50 of the ring/disconnect amplifier 52 during operation in the playback mode, thus preventing the ring-in circuit from being activated by an incoming telephone call during playback.

It will also be seen from FIG. 10 that the input terminal 606 of voice amplifier 560 will be connected, during playback, via contact set 556, to the incoming message head 562. Also, during playback, as may be seen from FIG. 4, terminal 10T1 of FIG. 10 will be maintained at LO by virtue of connection to ground through contact set 614 of the A/P relay. This being so, it will be recognized that amplifier 560 will be conditioned for reproducing voice signals from magnetic tape, i.e., its gain versus frequency characteristic will be thus conditioned.

Output terminal 620 of voice amplifier 560 will, during playback, be connected by means of contact set 568 of the A/P relay to the input terminal 634 of speaker amplifier 578.

It will also be seen from FIG. 10 that during playback the squelch terminal 583 of speaker amplifier 578 is maintained at ground potential by the action of contact set 642 of the A/P relay.

Thus it can be seen that previously recorded messages on the incoming message tape will be heard over loudspeaker 582 during playback.

It should also be noted that contact set 570 of the A/P relay serves to disconnect the bias/erase oscillator 596 from the tape heads.

MAKING THE OUTGOING MESSAGE TAPE

The device of the preferred embodiment of the present invention is provided with means whereby the user of the device may himself produce an output message tape of the kind shown schematically in FIG. 3.

In order to produce an outgoing message tape the user of the device must first manipulate the A/M switch to its M state (i.e., the state in which the moving contacts of contact sets 586, 588, 590, 591, (FIG. 4) and 60 (FIG. 1) are in contact with the six contacts marked M), and also open switch 636 (FIGS. 10), if closed, thereby assuring that A/P relay coil 574 is de-energized.

It will be observed that microphone 650 is now (with the A/M switch in its M position) connected via contact set 566 to the input terminal 606 of voice amplifier 560. Additionally, it will be noted that the output of T/R tone signal generator 652 (FIGS. 4) is connected, by means of interconnection 4R3, 10L2, and contact sets 586 and 566, to the input terminal 606 of voice amplifier 560.

Also it will be observed that contact set 591 (FIG. 4) causes an LO signal to be impressed upon terminal 10T2 via interconnection 4B1-10T2, thus conditioning the voice amplifier 564 for recording voice signals on magnetic tape.

Output terminal 620 of voice amplifier 560 is connected by means of contact sets 568 and 588 to input terminal 564 of the network comprising resistor 656 and capacitor 685, said network serving to provide equalization of the output signal from the voice amplifier 560 appropriate for application to the outgoing message tape head 564. Additionally connected to outgoing message tape head 564 via capacitor 660 and contact sets 590 and 570 is an AC bias signal from bias/erase oscillator 596. The output signal from the bias/erase oscillator is also connected via capacitor 662 to outgoing message erasing head 600 for the purpose of erasing previously recorded information or signals from the outgoing message tape during the making of a new outgoing message tape.

Means are provided whereby the user of the device of the invention may, by manipulating a single switch (670-FIG. 4), control the operation of the outgoing message tape transport during the preparation of an outgoing message tape, and automatically record the proper T/R tone signals (230, 232, 234, 236, FIG. 3).

Referring now to FIG. 4, and assuming that the user has conditioned the device of the preferred embodiment for making an outgoing message tape as described above, the user may then close microphone switch 670 and begin speaking his first outgoing message (222-FIG. 3) into the microphone. (It is, of course, assumed that the outgoing message tape loop 220 (FIG. 3) was in its home position at the time of closing microphone switch 670; which condition the user was able to check by determining that ready 444 was illuminated.)

It will be seen by reference to FIG. 4 that when switch 670 was in the open position input terminal 672 of NAND gate 674 was maintained at L1 level by current flowing through resistor 676 (typically, 10,000 Ohms) from the plus five volt power supply.

Upon closure of switch 670, however, input terminal 672 of gate 674 will be taken to LO level (grounded).

Additionally it may be seen that input terminal 678 of gate 674 was also maintained at L1 level through the action of the voltage divider network comprising resistors 680 (typically, 10,000 Ohms) and 682 (typically, 12,000 Ohms).

Therefore, by reason of the well-known action of NAND gates, the output terminal 684 of gate 674 will be switched from LO to L1 upon closure of microphone switch 670. The output signal of NAND gate 674 is connected to the input terminal of inverter 686.

Thus it may be seen that when the output terminal of NAND gate 674 switches from LO to L1 the output terminal 688 of inverter 686 switches from L1 to LO. Capacitor 690 (typically, 10 Microfarads), is connected to output terminal 688 of inverter 686, and serves to complete a negative-going (i.e., LO) pulse to input terminal 678 of NAND gate 674 whenever the output at terminal 688 of inverter 686 switches from L1 to LO.

Said negative-goin (LO) pulse continues to exist at terminal 678 until capacitor 690 becomes charged to L1 level by current flowing through resistors 680 and by current flowing out of input terminal 678 of NAND gate 674. Typically, th duration of the L) pulse may be 50 milliseconds.

In view of the above it will be seen that the output at terminal 684 of NAND gate 674 will remain at the L1 level for the duration of said LO pulse, occurring at terminal 678, even though the contacts of microphone switch 670 may open momentarily during that period. Such momentary switch openings, immediately following closure, are the well-known result of contact bounce, which may produce one or more false logic signals. It will be recognized that the just-described circuit serves to eliminate the effects of contact bounce.

It may also be seen form FIG. 4 that if the contacts of microphone switch 670 are opened after the termination of said LO pulse at terminal 678, the input terminal 672 of NAND gate 674 will go to the L1 level, whereupon the output signal at terminal 684 will go from the L1 state to the LO state; it being recognized that input terminal 678 has previously gone to the L1 state, at the end of said LO pulse.

When terminal 684 goes to LO, terminal 688 goes to L1 by virtue of the action of inverter 686. A positive-going pulse then appears at point 678, the positive-going pulse then appears at point 678, the positive-going pulse is prevented from exceeding the maximum allowable voltage at input terminal 678 of NAND gate 674 by the action of diode 691.

Having thus described in detail the action of the contact bounce suppression circuit, it will now be seen that when microphone switch 670 is closed an L1 signal is applied to point 692 (FIG. 2) via interconnection 4R1-2T2, from the output terminal 684 of NAND gate 674.

Referring, then, to FIG. 2, it will be seen that said transition from LO to L1 at point 692 (terminal 2T2), by virtue of the action of the network comprising resistor 694 (typically, 2.7 Megohms), capacitor 696 (typically, 0.005 Microfarads), and diode 698, results in a positive-going (i.e., L1) pulse at set terminal 204 of flip-flop 206 (the OMN flip-flop).

Said positive-going pulse sets said flip-flop, resulting in the energization of the outgoing message tape transport drive motor 212, as previously described.

Reviewing the above discussion, it will be seen that the user of the device has closed microphone switch 670, and may now commence to speak the first outgoing message into the microphone 650 (FIG. 10).

The user continues to maintain microphone switch 670 in its closed state while finishing his recitation of the first outgoing message to the microphone 650.

It will be seen that when the A/M switch was placed in the M state input terminal 368 of NAND gate 346 (FIG. 4) went to LO level as a result of the action of switch contacts 591. By reason of the well-known action of NAND gates, the output terminal 370 of NAND gate 346 thereupon went to its L1 state; thus maintaining integrated circuit terminal 2 (i.e., one of the reset terminals of timer 342) at L1 level. This condition is maintained so long as the A/M switch is in its M position. It will be recalled that it is a property of type 7493 integrated circuit counters that both of their two reset terminals (i.e., integrated circuit terminals 2 and 3 of integrated circuit timer (counter) 342) must be in the L1 state in order for a reset action to take place.

It may further be seen from FIG. 4 that whenever microphone switch 670 is closed, thereby maintaing an L1 signal at terminal 684 of NAND gate 674, reset terminal 372 of timer 342 is maintained at L1 level by means of the diode 700, which is connected between terminal 684 and terminal 372.

Thus it will be recognized that timer 342 is maintained in its reset or zero count state so long as and whenever microphone switch 670 is closed during the making of an outgoing message tape.

Having completed his delivery of the first outgoing message to microphone 650, the user of the device immediately opens microphone switch 670, whereupon, as previously described, the output signal at terminal 688 of inverter 686 goes from LO to L1. This transition is coupled by means of capacitor 702 (typically, 0.005 Microfarads) to the set terminal of flip-flop 704, thereby causing setting of flip-flop 704. It will be noted that resistor 706 serves to maintain the set terminal of flip-flop 704 in its LO state except when such a transition occurs at terminal 688.

The Q terminal 708 of flip-flop 704 goes to LO when flip-flop 704 is set, and thus initiates the production of an output tone signal by T/R tone signal generator 652.

T/R tone signal generator 652 may, for instance, be a conventional audio signal generator having output frequency of, say, 4200 cycles per second, which is energized by the LO signal level at 710, and thus produces a suitable output tone signal at terminal 4R3 so long as and only so long as the LO level is maintained at terminal 710.

Said output signal from T/R tone signal generator 652 is coupled by interconnection 4R3-10L2, and the circuit of FIG. 10, as previously described, to the outgoing message tape head, thereby recording this tone on the outgoing message tape whenever T/R tone signal generator 652 is energized.

Going now to point 372 it will be seen that resistor 712 serves to maintain an LO signal at point 372 (by virtue of its connection to circuit ground), unless an L1 signal is impressed through either diode 700 or diode 714, or both.

It will also be seen in FIG. 4 that when microphone switch 670 is open NAND gate 674 output terminal 684 goes to the LO level.

It will also be remembered that the Q terminal 708 of flip-flop 704 is switched to LO upon the opening of microphone switch 670.

It follows, that, since the anodes of diode 700 and 714 are both impressed with LO signals, reset terminal 372 of timer 342 is at LO. This being so, timer 342 is allowed to count up in the manner previously described.

After timer 342 receives a total of eight drive pulses at its input terminal 374, i.e., after approximately two seconds, the output terminal 378 goes from LO to L1.

Output terminal 378 is coupled directly to reset terminal 720 of flip-flop 704, and thus flip-flop 704 is reset at the termination of said counting interval, i.e., when terminal 378 of timer 342 goes to L1.

When flip-flop 704 is reset (*a*) the T/R tone signal generator is de-energized, thereby terminating the T/R tone signal, which has been recorded on the outgoing message tape (230–FIG. 3), (*b*) timer 342 is reset to its zero count state, by means of the L1 signal impressed on reset terminal 372 from Q terminal 708 of flip-flop 704 by means of diode 714, (*c*) an L1 signal is transmitted by interconnection 4R2–2R1 to point 722 (FIG. 2), which is the input terminal of the network comprised of resistor 724 (typically, 2.7 Megohms), capacitor 726 (typically, 0.005 Microfarads), and diode 728. The transition from LO to L1 at point 722 produces a positive-going (i.e., L1) pulse at point 280, which is connected to reset terminal 418 of flip-flop 206, thereby resetting flip-flop 206, and de-energizing output message tape transport drive motor 212.

It should be noted that the user of the device must release the microphone switch 670 for at least the duration of the counting period of timer 342 (FIG. 4), since otherwise, if the user closes the microphone switch during this counting period, timer 342 will be reset, thus extending the time duration of the T/R tone signal as recorded on the outgoing message tape.

Assuming that the user keeps microphone switch 670 open for this time period, the first outgoing message, followed by its associated T/R tone signal has now been recorded on the outgoing message tape, and the outgoing message tape drive motor will have been de-energized, and thus the outgoing message tape loop stopped, in readiness for the recording of another outgoing message.

The user may thereafter, by repeating the above manipulations of the single switch 670, and delivering additional outgoing messages to microphone 650, record as many outgoing messages as he chooses, within the limitations of the outgoing message tape loop length.

At the termination of the last such outgoing message 228 (FIG. 3) it will be seen that it is necessary to fill any remaining portion of the outgoing message tape loop with recorded T/R tone signals.

To accomplish this, microphone switch 670 is opened as before, immediately following the delivery of the last outgoing message to microphone 650. However, immediately after being opened, microphone switch 670 must be reclosed. (This reclosure must occur within the full counting period of timer 342, (e.g., 2 seconds.) As described above, so long as microphone switch 670 remains closed timer 342 is inhibited from counting by means of an L1 signal at its reset terminal 372, thereby preventing the resetting of flip-flop 704 and the subsequent termination of the T/R tone signal, and de-energization of the outgoing message motor 212.

The microphone switch remaining closed, the outgoing message tape continuous to be driven by the outgoing message tape transport drive motor 212, and the T/R tone signal continues to be recorded on the outgoing message tape until the home position sensing means 246 arrives in coacting relationship with the home position detector (FIG. 6), at which time a reset signal arrives (via interconnection 2L1–6T1) at the reset terminal 418 of flip-flop 206, in the manner previously described, stopping the outgoing message tape transport drive motor.

In the manner described above, the arrival of the outgoing message tape loop at its home position results in the illumination of ready light 444, signalling to the user that the outgoing message tape recording process has been completed. At this time the user may open microphone switch 670 and return the A/M switch to its A state.

Checking the Outgoing Message Tape

Means are also provided for checking the content and operation of the outgoing message tape loop. To do this the user moves the A/C (Answer/Check) switch (FIG. 1), comprising contact sets 270 and 62, to its C position. Contact set 62 serves to prevent the ring-in circuit from being activated by incoming telephone calls while the outgoing message tape is being checked. This action is accomplished, as seen in FIG. 1, by grounding input terminal 50 of the ring/disconnect amplifier 52, as hereinabove described.

Contact set 270 serves to maintain an LO signal at terminal 1R2 of FIG. 1 when the outgoing message tape is being checked. This LO signal at 1R2 simulates the automatic answering cycle condition without connection to the telephone line.

Manual start switch 740 is closed momentarily when it is desired to start the outgoing message transport drive motor, and thus initiate playback of the first outgoing message on the outgoing message tape. Said first outgoing message is then heard by means of loudspeaker 582 (FIG. 10), as previously described. At the end of the first outgoing message the T/R tone signal 230 causes setting of flip-flop 256 and energization of relay 258, as hereinabove described. The trailing edge 282 of said first T/R tone signal recording reaching the outgoing message head resets the outgoing message tape transport drive motor flip-flop 206, by means of the T/R tone signal detector and interconnection 2L4–4T1, in the manner previously described.

As hereinabove described, the outgoing message tape transport drive motor 212 is stopped, and the circuit conditioned to receive incoming messages (if a call were in progress). The user can now manually restart the outgoing message tape transport drive motor, by means of the manual start switch 740, and listen to the second outgoing message. In this connection it will be seen that when the manual start switch is closed, it not only sets the OMM flip-flop 206, as previously described, but it also resets the T/R flip-flop 256, via interconnection 2T1–4T4, and gates 390 and 352.

This manipulation of manual start switch 740 may be repeated by the user until all outgoing messages have been reviewed and the outgoing message tape loop has reached its home position, as indicated by the lighting of the ready light 444, whereafter the Answer/Check switch (A/C), including contact sets 270 and 62 may be returned to its A position, and the device of the preferred embodiment then used for automatic answering.

OPERATION

As may be seen from the above, the operation of the preferred embodiment is substantially automatic. After installation, adjustment, and outgoing message tape preparation, the device of the preferred embodiment automatically delivers a series of messages and/or questions to each caller unlss (a) the caller hangs up prematurely, or (b) the caller fails to speak within, e.g., 8.5 seconds, after any outgoing message, or (c) the handset of a telephone connected to the same line is lifted, or (d) the preset maximum answering cycle time (e.g., 4 minutes) has elapsed.

Manual control means of the kind well-known in the tape recorder art are provided for reviewing previously recorded incoming messages. As described above, manually operable means are also provided for recording outgoing message tapes. As also described above the user may break into any incoming call without manipulating manual, or even being near the device, by simply lifting the handset of any telephone connected to the same line. A manual control (pushbutton is provided, momentary depression of which will silence the monitor speaker for the remainder of the call during which it is depressed.

It will thus be seen that the objects set forth above, among those made apparent from the preceding description, are efficiently attained, and since certain changes may be made in the above construction without departing from the scope of my invention, it is intended that all matter contained in the above description or shown in the accompanying drawings shall be interpreted as illustrative only, and not in a limiting sense.

It is particularly noted that although the invention has been disclosed as employing plural magnetic recording tapes, other multi-channel recording and reproducing arrangements may be employed, such as those shown and described in U.S. Pat. Nos. 2,989,585 and 3,131,937.

Additionally, one characteristic of an incoming message may be used to bring about the delivery of the next outgoing message, rather than two characteristics, as in the preferred embodiment. Thus, in an alternative embodiment, a caller pause detector may be used alone, this detector being disenabled for a predetermined interval after the delivery of each outgoing message.

Alternatively other characteristics of incoming messages, or combinations thereof, may be employed, with or without the two characteristics employed in the preferred embodiment, to bring about delivery of the next outgoing message.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A telephone answering and recording device adapted to be operated in a conversation mode with the caller and to be connected to a telephone line comprising:

a ring detector circuit operably connected to a telephone line to receive signals therefrom;

a first logic circuit connected to said ring detector circuit including a switching means operable to initiate operation of said device when it receives signals from said ring detector circuit and to deactivate said device when it receives a deactivation signal;

a pulse detecting means connected to receive voice signals form said telephone line when operation of said device has been initiated and operable to generate a timing reset signal each time a predetermined pulse level is received;

a second logic circuit connected to said pulse detecting means and adapted to pass said timing reset signal generated by said pulse detecting means, and operable to generate a continuous timing reset signal until at least one timing reset signal is received for each voice-receive cycle;

a first clock means connected to said second logic circuit to receive said timing reset signal when passed by said second logic circuit; said first clock means being operable to generate a first switching signal after a given timing cycle;

mode switching means connected to said telephone line and including a third logic circuit operable to alternately connect circuits associated with said mode switching means to said telephone line, said circuits associated with said mode switching means including a voice transmitting circuit containing a sequence of pre-recorded voice signals and control signals connected to said mode switching means and a voice recording circuit operable to record incoming voice signals connected to said mode switching means whereby said voice transmitting circuit or said voice recording circuit will alternately be connected to said telephone line through the operation of said third logic circuit respectively by said first switching signal or a second switching signal;

a control signal detector circuit means connected to said voice transmitting circuit and adapted to generate said second switching signal upon detection of one of said pre-recorded control signals of said voice transmitting circuit, said control signal detector circuit being connected to said third logic circuit to apply said second switching signal generated thereby to said third logic circuit, said first switching signal generated by said first clock means will cause said third logic circuit to switch said mode switching means to connect said voice transmitting circuit to said telephone line and said second switching signal generated by said control signal detector circuit will cause said third logic circuit to switch said mode switching means to connect said voice recording circuit to said telephone line thereby allowing a conversation to occur between said device and a caller based upon pauses in the voice signals causing said voice transmitting circuit to send each of said pre-recorded voice signals of said sequence over said telephone line at intervals determined by the presence of and lack of voice signals on said telephone line provided that the caller responds to some of said pre-recorded voice signals of said sequence of pre-recorded voice signals when said device is operating.

2. The device as defined in claim 1 including a second clock means connected to the first logic circuit and to the pulse detecting means, said second clock means operable to generate a disconnect signal after a predetermined time if not reset by a reset timing signal received from said pulse detecting means, said predetermined time of said second clock means being longer than the timing cycle of the first clock means.

3. The device as defined in claim 1 wherein the control signals have a frequency greater than 3,000 cycles per second.

4. The device as defined in claim 1 wherein a monitoring and amplifying circuit is operably connected to the telephone line when the device is operating whereby the conversation occurring between the device and the incoming caller is audibly reproduced.

5. The device as defined in claim 1 wherein a disconnect circuit means is included which is connected to the telephone line which is operable to sense changes in the direct current level on said telephone line, said disconnect circuit means operable to generate a disconnect signal upon detecting said changes and connected to the first logic means whereby the device is disconnected from the telephone line upon the detection of said changes in direct current level.

6. The device as defined in claim 5 wherein said disconnect means includes circuits which are operable to sense the small changes in DC level when a telephone connected in parallel with said device is actuated, whereby the device will be rendered inoperable when such a telephone is actuated due to the disconnect signal generated by the disconnect circuit means.

* * * * *